US012591478B2

(12) United States Patent
Sangra et al.

(10) Patent No.: US 12,591,478 B2
(45) Date of Patent: Mar. 31, 2026

(54) APPARATUS AND METHOD FOR GENERATING ALERT CONTEXT DASHBOARD

(71) Applicant: LogicMonitor, Inc., Santa Barbara, CA (US)

(72) Inventors: Sudhir Sangra, Pune (IN); Amol Parekh, Pune (IN); Sarita Sarita, Pune (IN); Sunil Sebastian, Pune (IN); Murtuza Talwari, Pune (IN)

(73) Assignee: LOGICMONITOR, INC., Santa Barbara, CA (US)

( * ) Notice: Subject to any disclaimer, the term of this patent is extended or adjusted under 35 U.S.C. 154(b) by 101 days.

(21) Appl. No.: 18/484,375

(22) Filed: Oct. 10, 2023

(65) Prior Publication Data

US 2025/0117276 A1    Apr. 10, 2025

(51) Int. Cl.
*G06F 11/00* (2006.01)
*G06F 11/07* (2006.01)

(52) U.S. Cl.
CPC .............................. *G06F 11/0769* (2013.01)

(58) Field of Classification Search
CPC .. G06F 11/0769; G06F 11/0766; G06F 11/30; G06F 11/3006; G06F 11/079
See application file for complete search history.

(56) References Cited

U.S. PATENT DOCUMENTS

| | | | | |
|---|---|---|---|---|
| 8,341,464 | B2 * | 12/2012 | Roussel | G06F 11/321 |
| | | | | 709/224 |
| 9,760,613 | B2 * | 9/2017 | Choudhary | G06F 9/542 |
| 10,162,693 | B1 * | 12/2018 | Contino | G06F 11/0742 |
| 10,459,779 | B2 * | 10/2019 | Tee | G06F 11/0751 |
| 10,459,818 | B2 * | 10/2019 | Cirne | G06F 11/0751 |
| 10,560,309 | B1 * | 2/2020 | Chitalia | H04L 41/0631 |
| 10,592,093 | B2 * | 3/2020 | Sainani | G06F 16/2462 |
| 11,526,422 | B2 * | 12/2022 | Drori | G06F 11/3466 |
| 11,868,937 | B1 * | 1/2024 | Culley | G06F 3/04842 |
| 2009/0307533 | A1 * | 12/2009 | Niikkonen | G06F 11/0781 |
| | | | | 714/45 |
| 2011/0061013 | A1 * | 3/2011 | Bilicki | G06Q 10/06393 |
| | | | | 715/771 |
| 2011/0239052 | A1 * | 9/2011 | Nguyen | G06F 11/0748 |
| | | | | 714/E11.178 |
| 2013/0111275 | A1 * | 5/2013 | Ganesan | G06F 11/0748 |
| | | | | 714/E11.119 |
| 2015/0254560 | A1 * | 9/2015 | Laredo | G06Q 30/0202 |
| | | | | 706/46 |

(Continued)

*Primary Examiner* — Jonathan D Gibson
(74) *Attorney, Agent, or Firm* — ArentFox Schiff LLP

(57) ABSTRACT

A method is provided for tracking and capturing trouble-shooting user activities performed for identifying a cause of an alert. Specifically, the method includes identifying an alert among a listing of alerts for troubleshooting the alert. The method also includes generating a dashboard template for an alert by tracking and capturing user activities performed while troubleshooting the alert, wherein the dashboard template comprises correlation coefficients of metrics and alert metric information. The method further includes generating a dynamic contextual dashboard in context of the alert using the dashboard template. The method further includes scoring and ranking a dynamic contextual dashboard associated with the alert using the dashboard template assigned to the alert cluster.

17 Claims, 21 Drawing Sheets

(56)　　　　　　References Cited

U.S. PATENT DOCUMENTS

| | | | |
|---|---|---|---|
| 2015/0280968 A1* | 10/2015 | Gates | G06F 11/0769 |
| | | | 714/37 |
| 2016/0077947 A1* | 3/2016 | Basu | G06F 11/0703 |
| | | | 714/45 |
| 2018/0198693 A1* | 7/2018 | Pathela | H04L 43/50 |
| 2021/0208865 A1* | 7/2021 | Stylos | G06F 8/65 |
| 2021/0409515 A1* | 12/2021 | Krishna | H04L 67/75 |
| 2022/0027249 A1* | 1/2022 | Dua | G06F 11/3466 |
| 2023/0102389 A1* | 3/2023 | Raghavan | G06Q 10/20 |
| | | | 705/7.39 |
| 2024/0177239 A1* | 5/2024 | Jacob | G06N 20/00 |
| 2024/0264894 A1* | 8/2024 | Napa | G06F 11/0709 |
| 2024/0340216 A1* | 10/2024 | Singh | H04L 41/0631 |
| 2024/0361760 A1* | 10/2024 | Gupta | G06F 11/3006 |
| 2024/0362502 A1* | 10/2024 | Tsai | G06N 20/00 |
| 2025/0117276 A1* | 4/2025 | Sangra | G06F 11/0769 |

* cited by examiner

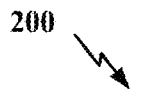

200

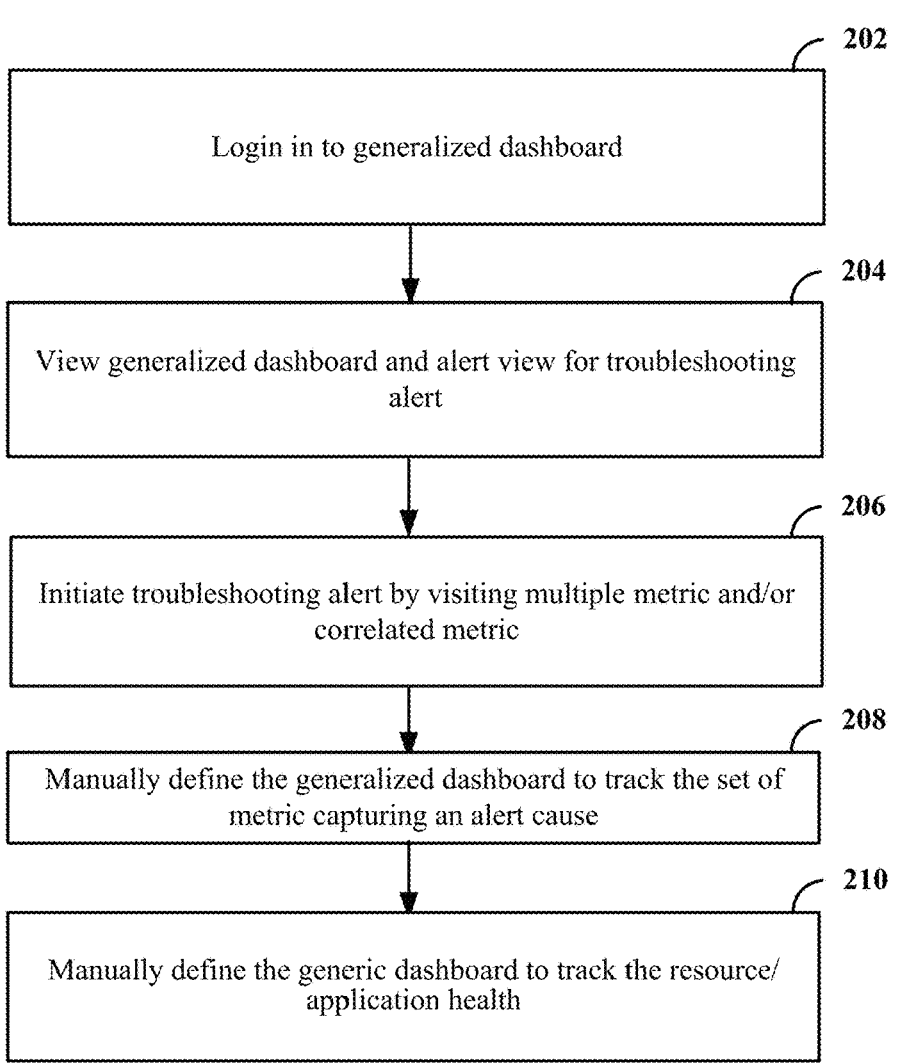

202

Login in to generalized dashboard

204

View generalized dashboard and alert view for troubleshooting alert

206

Initiate troubleshooting alert by visiting multiple metric and/or correlated metric

208

Manually define the generalized dashboard to track the set of metric capturing an alert cause

210

Manually define the generic dashboard to track the resource/ application health

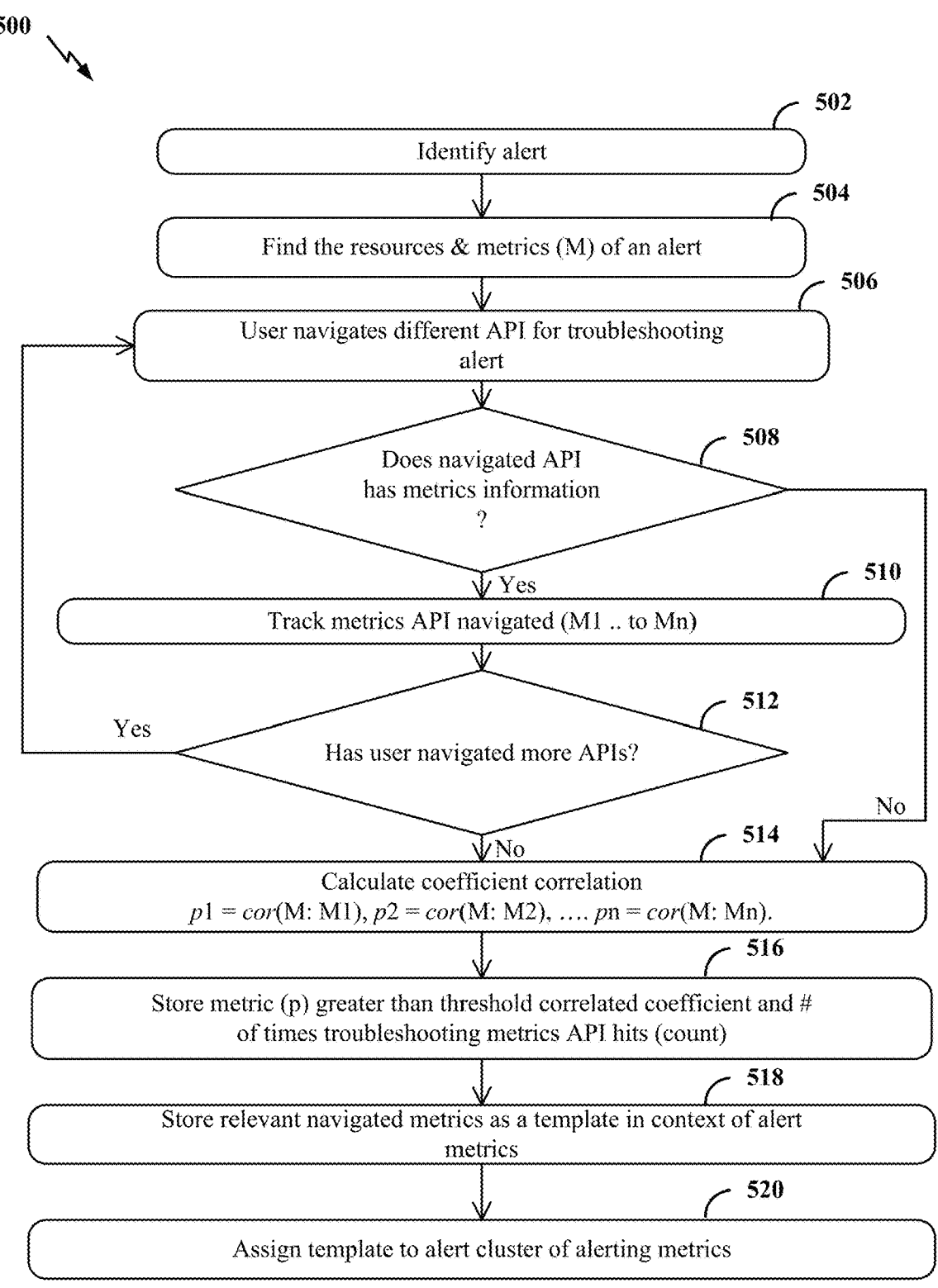

502

Identify alert

504

Find the resources & metrics (M) of an alert

506

User navigates different API for troubleshooting alert

508

Does navigated API has metrics information ?

510

Yes

Track metrics API navigated (M1 .. to Mn)

512

Yes

Has user navigated more APIs?

No

No

514

Calculate coefficient correlation
$p1 = cor(M: M1)$, $p2 = cor(M: M2)$, .... $pn = cor(M: Mn)$.

516

Store metric (p) greater than threshold correlated coefficient and # of times troubleshooting metrics API hits (count)

518

Store relevant navigated metrics as a template in context of alert metrics

520

Assign template to alert cluster of alerting metrics

```
Template_format:
{
  "event":[
    {
      "event_datasource":<event_datasource_name>,
      "event_datapoint": <event_datapoint_name>,
      "metricsVisited":[
        {
          "graph_datasource":<graph_datasource_name>,
          "graph_metrics": <graph_datapoint_name>,
          "correlation": <correlation between <graph_metric> and <event_metric>,
        },
        <... list of metric visited>
      ]}]
}
```

600b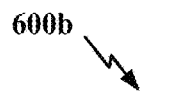

```
DashBoard_template_example:
{
  "event":[
    {
      "event_datasource": "KafkaConsumers",
      "event_metric": "consumerLag",
      "metricsVisited":[
        {
          "graph_datasource": "Java Thread & up time",
          "graph_metrics": "cpuUsage",
          "correlation":0.8,
        },
        {
          "graph_datasource": "Java Thread & up time",
          "graph_metrics": "heap",
          "correlation":0.8,
        },
        {
          "graph_datasource": "MySql",
          "graph_metrics": "connectionUsage",
          "correlation":0.73,
        },
        {
          "graph_datasource": "MySql",
          "graph_metrics": "abortedConnections",
          "correlation":0.93,
        },
        {
          "graph_datasource": "Java Thread & uptime",
          "graph_metrics": "cpuUsage",
          "correlation":0.93,
        }
      ]
    }
  ]
}
```

FIG. 6B

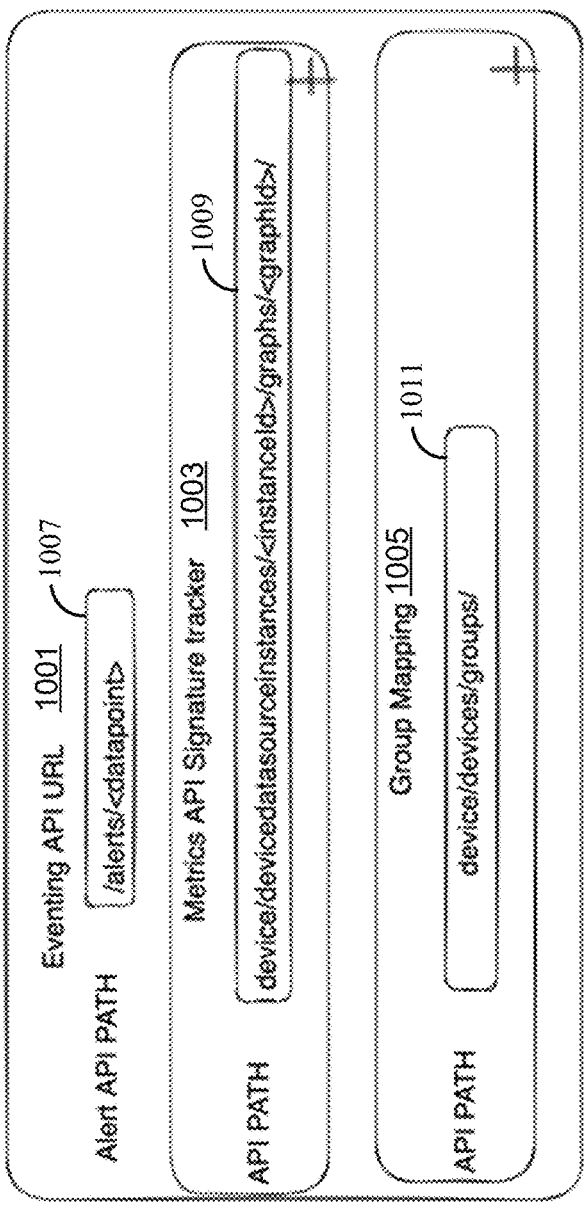
FIG. 10

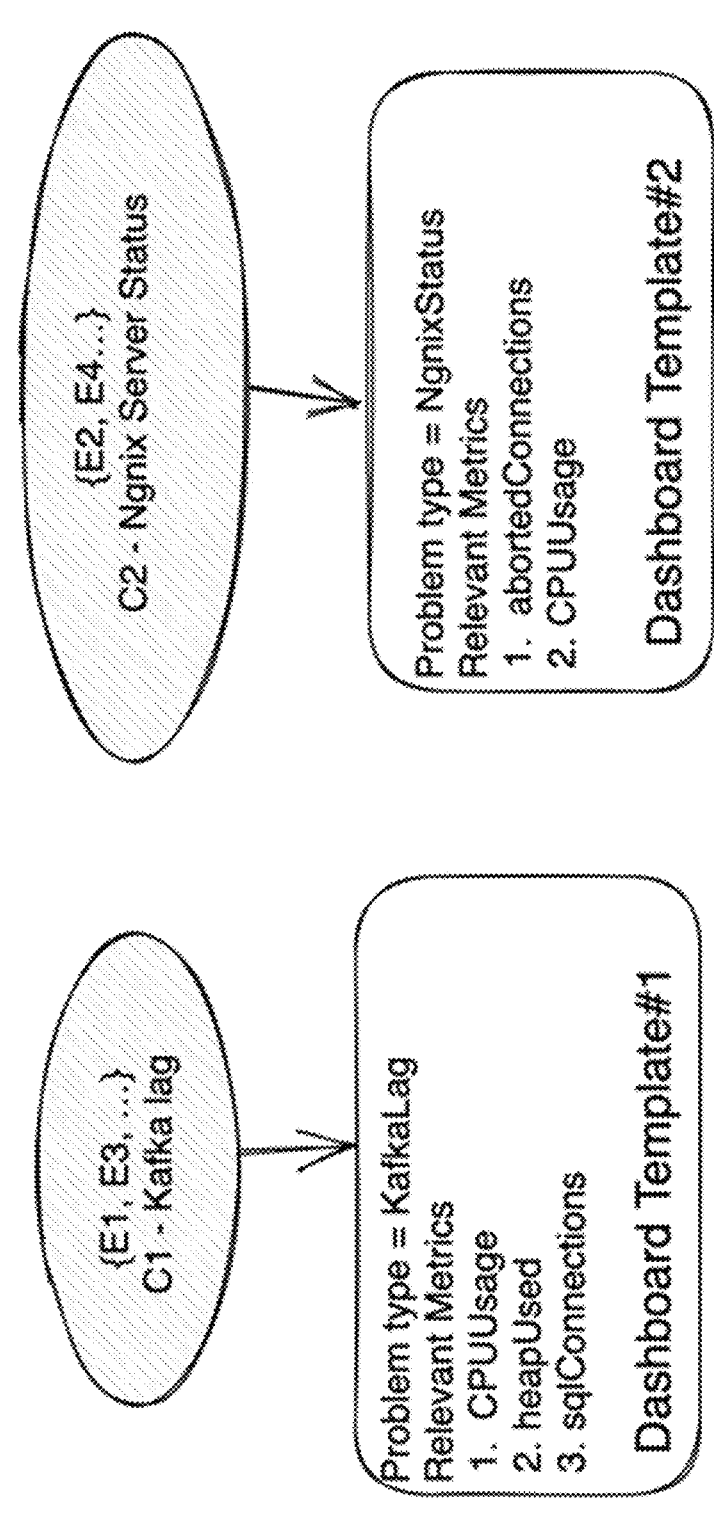
FIG. 11A

1100D

1101

Template #1

| Alert Metrics | Template Metrics | Correlation |
|---|---|---|
| kafkaLag | cpuUsage | -0.8 |
| kafkaLag | heapUsage | 0.5 |
| kafkaLag | sqlConnections | 0.89 |
| | Template Rollup ( Averaging the absolute correlation value) | 0.73 |

1103

Template #3

| Alert Metrics | Template Metrics | Correlation |
|---|---|---|
| kafkaLag | metadataOperations | 0.4 |
| kafkaLag | heapUsage | 0.5 |
| | Template Score ( Averaging the absolute correlation value) | 0.45 |

1105

Template #n

| Alert Metrics | Template Metrics | Correlation |
|---|---|---|
| kafkaLag | cpuUsage | -0.8 |
| kafkaLag | inactiveUsers | 0.4 |
| | Template Score (Averaging the absolute correlation value) | 0.6 |

FIG. 11D

Event Cluster (KafkaLag) - Event E11

Relevant Dashboard#1 - Score (79) RANK #1 — 1107

| Alert Metrics | Context | Relevant Metrics | Correlation |
|---|---|---|---|
| kafkaLag | Resource1, monitored Class1, Monitored Object1 | cpuUsage | -0.9 |
| | Resource1, monitored Class2, Monitored Object2 | heapUsage | 0.5 |
| | Resource3, monitored Class3, Monitored Object3 | sqlConnection | 0.99 |

Relevant Dashboard #n - Score (70) RANK #2 — 1109

| Alert Metrics | Context | Relevant Metrics | Correlation |
|---|---|---|---|
| kafkaLag | Resource4, monitored Class4, Monitored Object4 | cpuUsage | .70 |
| | Resource5, monitored Class5, Monitored Object5 | inactiveUsers | .70 |

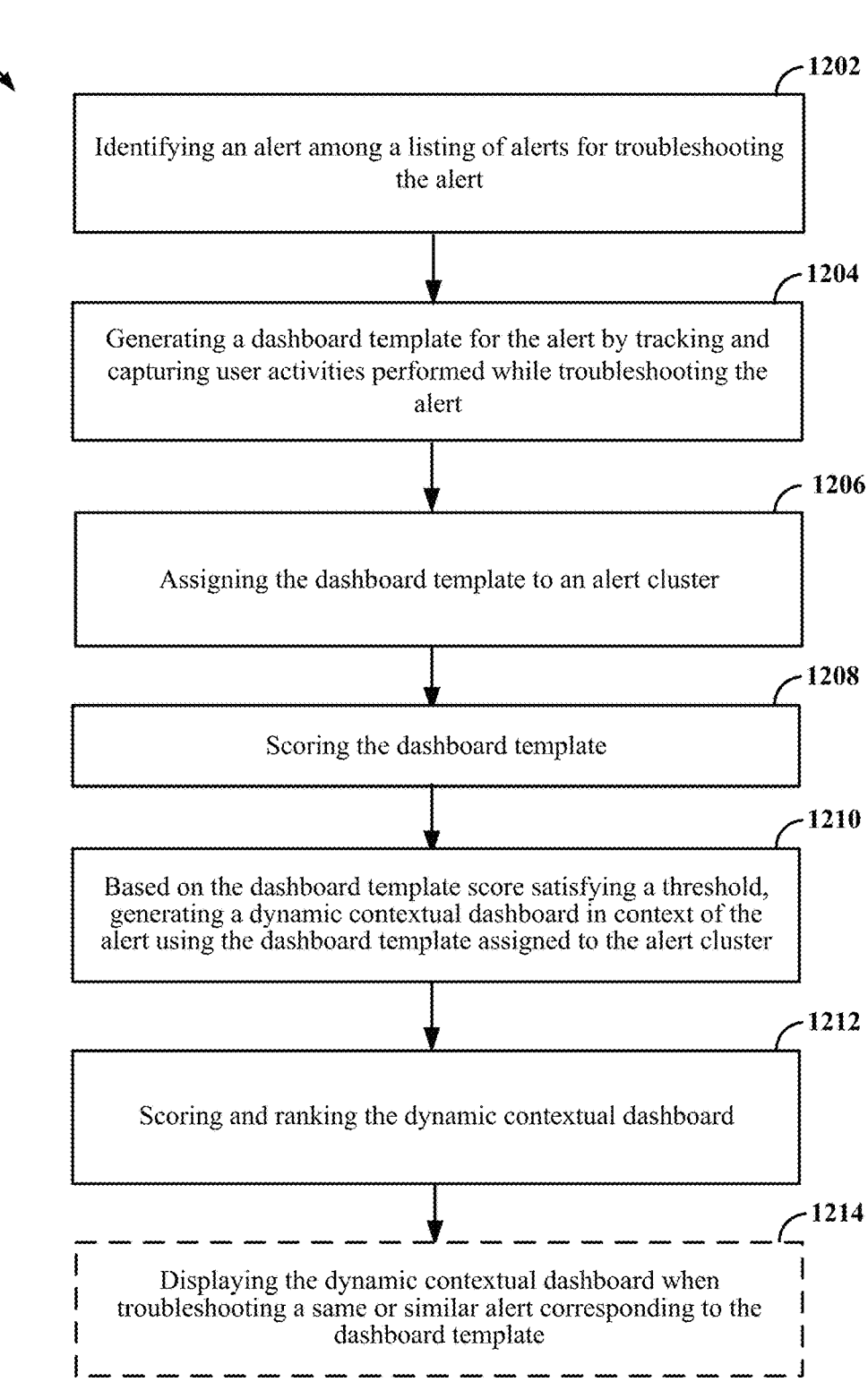

1200

1202

Identifying an alert among a listing of alerts for troubleshooting the alert

1204

Generating a dashboard template for the alert by tracking and capturing user activities performed while troubleshooting the alert

1206

Assigning the dashboard template to an alert cluster

1208

Scoring the dashboard template

1210

Based on the dashboard template score satisfying a threshold, generating a dynamic contextual dashboard in context of the alert using the dashboard template assigned to the alert cluster

1212

Scoring and ranking the dynamic contextual dashboard

1214

Displaying the dynamic contextual dashboard when troubleshooting a same or similar alert corresponding to the dashboard template

FIG. 12

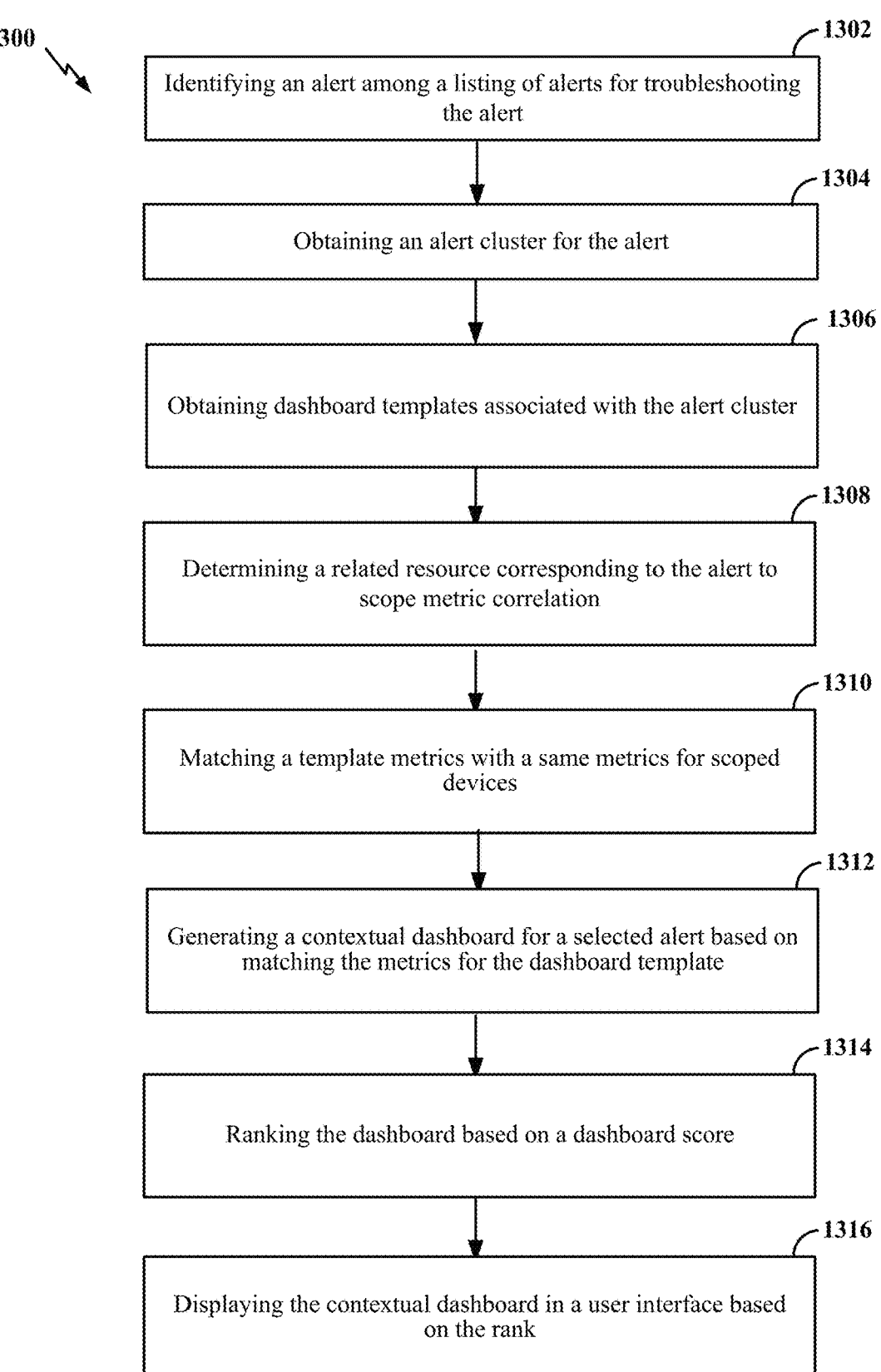

1300

1302
Identifying an alert among a listing of alerts for troubleshooting the alert 1304
Obtaining an alert cluster for the alert 1306
Obtaining dashboard templates associated with the alert cluster 1308
Determining a related resource corresponding to the alert to scope metric correlation 1310
Matching a template metrics with a same metrics for scoped devices 1312
Generating a contextual dashboard for a selected alert based on matching the metrics for the dashboard template 1314
Ranking the dashboard based on a dashboard score 1316
Displaying the contextual dashboard in a user interface based on the rank

FIG. 13

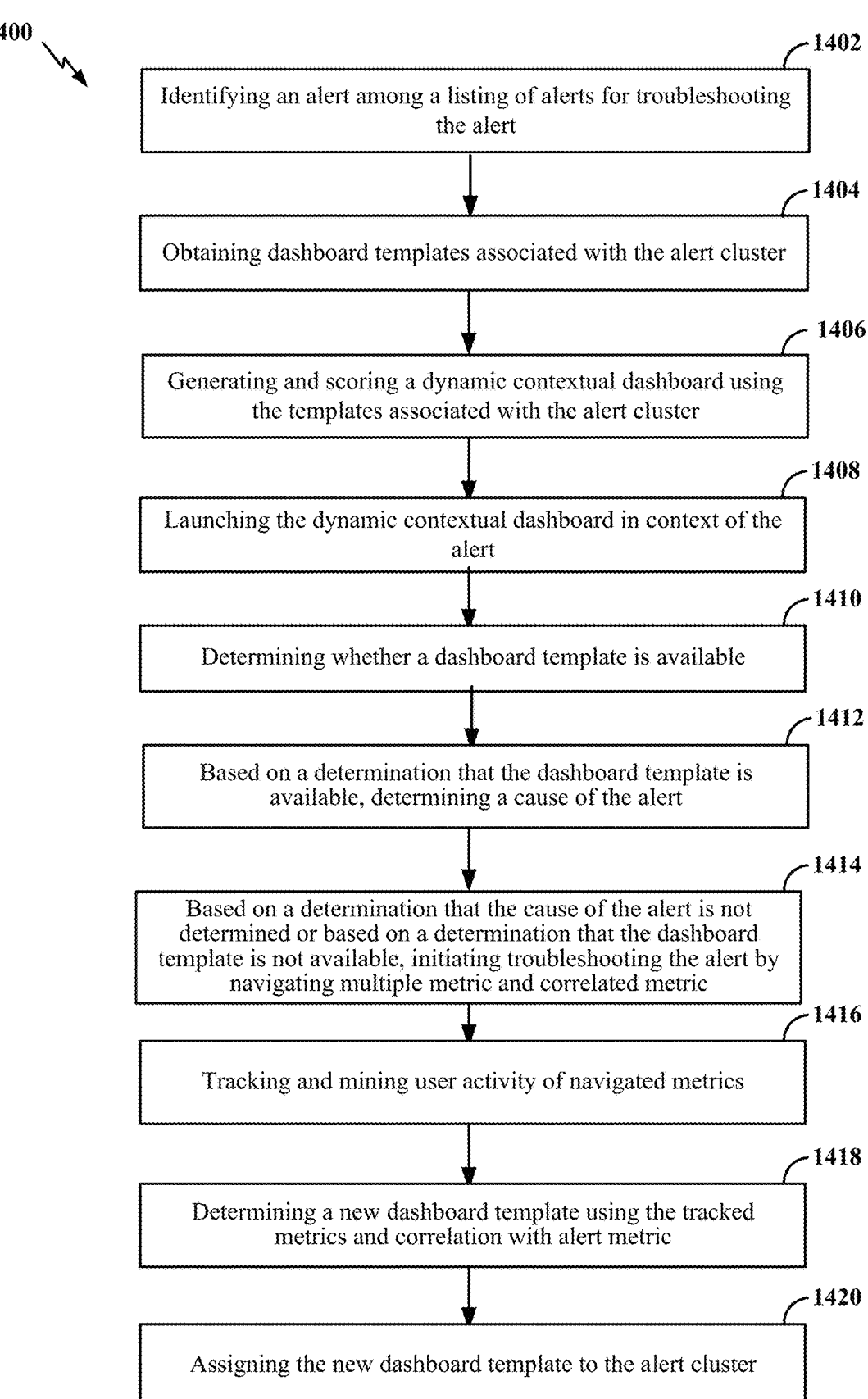

1400

1402
Identifying an alert among a listing of alerts for troubleshooting the alert 1404
Obtaining dashboard templates associated with the alert cluster 1406
Generating and scoring a dynamic contextual dashboard using the templates associated with the alert cluster 1408
Launching the dynamic contextual dashboard in context of the alert 1410
Determining whether a dashboard template is available 1412
Based on a determination that the dashboard template is available, determining a cause of the alert 1414
Based on a determination that the cause of the alert is not determined or based on a determination that the dashboard template is not available, initiating troubleshooting the alert by navigating multiple metric and correlated metric 1416
Tracking and mining user activity of navigated metrics 1418
Determining a new dashboard template using the tracked metrics and correlation with alert metric 1420
Assigning the new dashboard template to the alert cluster

FIG. 14

APPARATUS AND METHOD FOR GENERATING ALERT CONTEXT DASHBOARD

TECHNICAL FIELD

The present disclosure relates generally to troubleshooting of Information Technology (IT) infrastructure components, including one or more techniques for generating alert contextual dashboards based on historical activities.

BACKGROUND

Computer networks typically include information technology (IT) infrastructure components, which are the things used to develop, test, monitor, control or support IT services. The primary IT infrastructure components are hardware platforms, operating system platforms, applications, data management and storage systems, and networking and telecommunications platforms. IT infrastructure components include servers, storage, networking and applications. Computer hardware platforms include client machines and server machines. Operating system platforms include platforms for client computers and servers. Operating systems are software that manage the resources and activities of the computer and act as an interface for the user. Enterprise and other software applications include software from SAP and Oracle, and middleware software that are used to link application systems. Data management and storage is handled by database management software and storage devices that include disk arrays, tape libraries, and storage area networks. Networking and telecommunication platforms include switches, routers, firewalls, load balancers (including the load balancers of cloud services), application delivery controllers, wireless access points, VoIP equipment and WAN accelerators. IT infrastructure includes the hardware, software and services to maintain websites, intranets, and extranets, including web hosting services and web software application development tools.

By monitoring IT infrastructure components, administrators can better manage these assets and their performance. Performance, availability and capacity metrics are collected from the IT infrastructure components and then uploaded to a management server for storage, analysis, alerting, and reporting to administrators. Software agents may be used to collect alerts and metrics about IT infrastructure components. For instance, an agent may be installed on the IT infrastructure components, and to monitor the IT infrastructure component. Agents may be used to monitor various aspects of IT infrastructure at various layers from low level hardware to top layer applications.

Metrics, monitoring, and alerting are all interrelated concepts that form a basis of a monitoring system. In simple terms, a monitoring platform may collect metrics, which are then converted into alerts based on exceeding thresholds. These concepts have the ability to provide visibility into the health of systems, help users understand trends in usage or behavior, or to understand an impact of changes made the system. If the metrics fall outside of expected ranges, these systems may send notifications to prompt an operator to investigate an alert or issue, and then assist in surfacing information to help identify possible root causes of the alert or issue.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to method and apparatus for generating a dynamic contextual dashboard using dashboard templates. An aspect of the subject matter described in this disclosure is implemented in a method of performing troubleshooting. The method includes identifying an alert among a listing of alerts for troubleshooting the alert. The method also includes generating a dashboard template for the alert by tracking and capturing user activities performed while troubleshooting the alert, where the dashboard template comprises correlation coefficients of metrics and alert metric information. The method further includes generating a dynamic contextual dashboard in context of the alert using the dashboard template assigned to the alert cluster. The method further includes scoring and ranking the dynamic contextual dashboard.

Another further aspect of the subject matter described in this disclosure can be implemented in a system for generating a dynamic contextual dashboard using dashboard templates. The system includes a processor and a memory accessible by the processor and storing computer-readable instructions. The processor being configured to identify an alert among a listing of alerts for troubleshooting the alert. The processor is also configured to generate a dashboard template for the alert by tracking and capturing user activities performed while troubleshooting the alert, where the dashboard template comprises correlation coefficients of metrics and alert metric information. The processor is further configured to generate a dynamic contextual dashboard associated with the alert using the dashboard template. The processor is further configured to score and rank the dynamic contextual dashboard.

Another further aspect of the subject matter described in this disclosure can be implemented in a non-transitory computer-readable storage medium storing instructions which when executed by at least one processor causes the at least one processor to identify an alert among a listing of alerts for troubleshooting the alert. The processor is also configured to generate a dashboard template for the alert by tracking and capturing user activities performed while troubleshooting the alert, where the dashboard template comprises correlation coefficients of metrics and alert metric information. The processor is further configured to generate a dynamic contextual dashboard associated with the alert using the dashboard template. The processor is further configured to score and rank the dynamic contextual dashboard.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 2 illustrates an example flowchart of an example method of troubleshooting using dashboards or alerts without context.

FIG. 5 illustrates an example flowchart of an example method of generating a dashboard template in accordance with one or more techniques of this disclosure.

FIG. 6B illustrates an example of a dashboard template in accordance with one or more techniques of this disclosure.

FIG. 10 illustrates an example of an API discovery model in accordance with one or more techniques of this disclosure.

FIGS. 11A-F illustrates a process of assigning dashboard templates from an alert for a same or similar problem type to the alert cluster, template with correlation coefficient and score, and user interface to display the dynamic contextual dashboard in accordance with one or more techniques of this disclosure.

FIG. 12 illustrates a flowchart example of an example method of generating a dashboard template for generating a dynamic contextual dashboard when troubleshooting an alert in accordance with one or more techniques of this disclosure.

FIG. 13 illustrates a flowchart example of an example method of generating a dynamic contextual dashboard based on a dashboard template for troubleshooting an alert in accordance with one or more techniques of this disclosure.

FIG. 14 illustrates a flowchart example of an example method of troubleshooting an alert via a dynamic contextual dashboard in the context of an alert.

Like reference numbers and designations in the various drawings indicate like elements.

DETAILED DESCRIPTION

Figure 1:
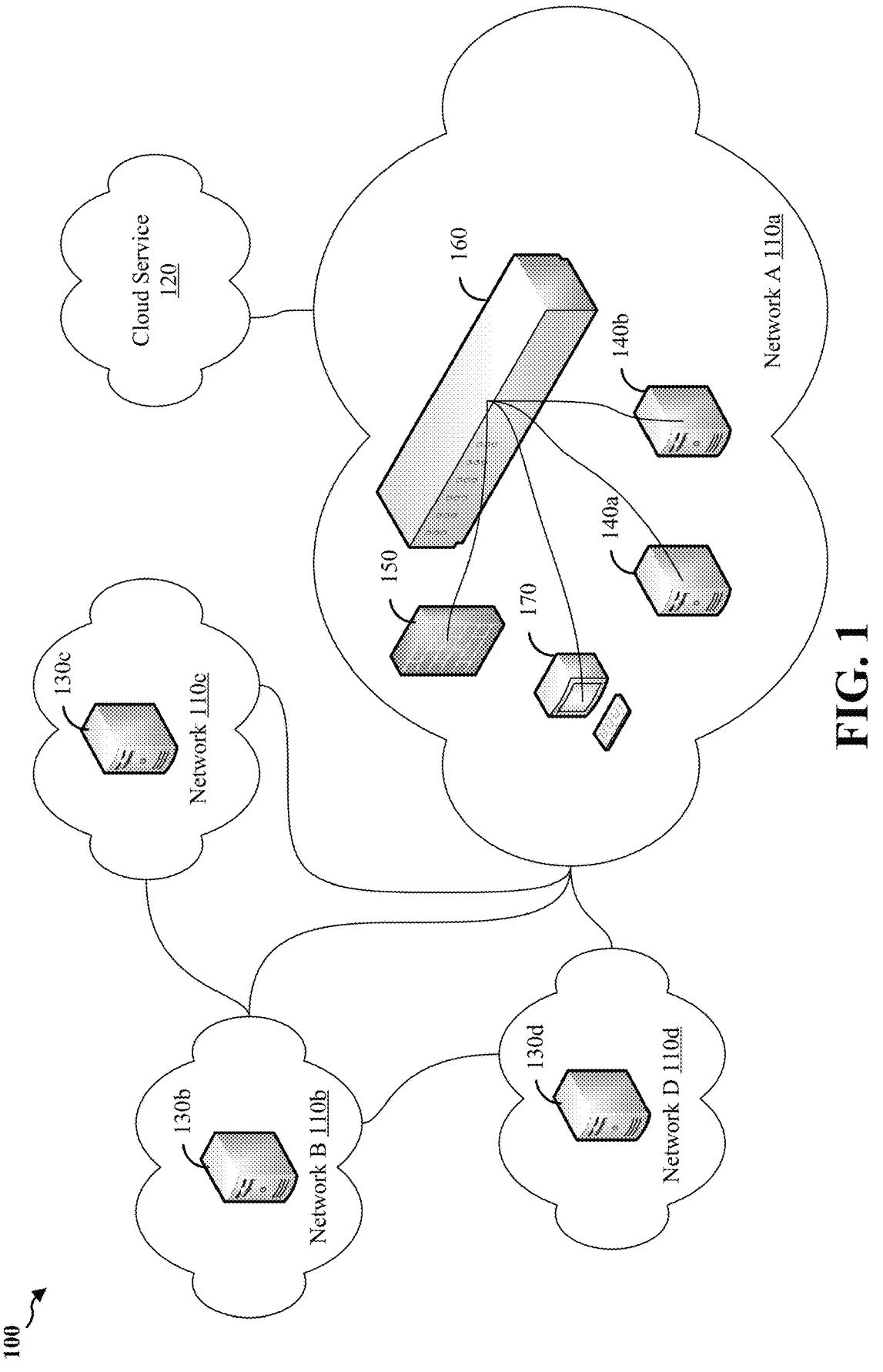
FIG. 1 illustrates an example diagram of a network system.

The following description is directed to some exemplary aspects for the purposes of describing innovative aspects of this disclosure. However, a person having ordinary skill in the art will readily recognize that the teachings herein can be applied in a multitude of different ways.

Metrics represent a raw measurement of resource usage or behavior that may be observed and collected through a system. These may be low-level usage summaries provided by an operating system, or they can be higher-level types of data tied to the specific functionality or work of a component. Some metrics may be presented in relation to a total capacity, while others are represented as a rate that indicates the "busyness" of a component. As an example, metrics may already be exposed by the operating system to represent the usage of underlying physical resources. For example, data about disk space, CPU load, swap usage, etc. are already available and may provide immediate value. In addition, this type of metric may be forwarded to a monitoring system without much additional work. Many web servers, database servers, and other software also provide their own metric which can be passed forward as well.

Metrics are useful because they provide insight into the behavior and health of systems. This is particularly true when analyzed in the aggregate. Metrics may represent the raw material used by a monitoring system to build a holistic view of the system environment, automate responses to changes, and alert human beings when required. In addition, metrics are the basic values used to understand historical trends, correlate diverse factors, and measure changes in performance, consumption, or error rates.

While metrics represent data in a system, monitoring is the process of collecting, aggregating, and analyzing those values to improve awareness of component's characteristics and behavior. As such, the data from various parts of a system environment may be collected into a monitoring system that is responsible for storage, aggregation, visualization, and initiating automated responses when the values meet requirements.

Generally, the difference between metrics and monitoring mirrors the difference between data and information. Data is composed of raw, unprocessed facts whereas Monitoring takes metrics data, aggregates it, and presents it in various ways to allow users to extract insights from the collection of individual pieces. Monitoring systems may provide a method of organizing and correlating data from various inputs. Accordingly, for the metrics to be useful, administrators need to be able to recognize patterns between different resources and across groups of servers. For example, if an application experiences a spike in error rates, an administrator should be able to use the monitoring system to discover if that alert coincides with the capacity exhaustion or a related resource. In the context of this disclosure, monitoring systems may be used as a platform for defining and activating alerts.

Alerting is the responsive component of a monitoring system that performs actions based on changes in metric values. Alerts definitions are composed of two components: a threshold or metrics-based condition, and an action to perform when the values fall outside of the acceptable conditions. The main purpose of alerting is to inform a user (or operator) to take note of a current status of a system. Automating responses is an important mechanism for ensuring that notifications are only triggered for situations that require consideration from a knowledgeable operator. The alert itself may contain information about what is wrong ad where to find additional information. The user responding to the alert can then use a monitoring system and tools such as log files to investigate the cause of an issue (alert or event) and then implement a mitigation strategy.

Alerts may be generated by a monitoring system to exhibit application and/or system behavior, which may need to be handled within a service level agreement (SLA) time to minimize business impact. These alerts may be an entry point for troubleshooting behavior. For troubleshooting alerts, a user may traverse through different entities such as time series graphs, related alerts, multiple log patterns mined via queries, application interactions via topology, and traces between applications and query trace patterns (also known as a troubleshooting flow) to identify the root cause of the alert.

However, every time a same or similar kind of alert is generated for the same or similar application and/or resource, the user will need to go through the troubleshooting flow. As such, there is no tracking of troubleshooting activities in the context of alerts. This means that a user must perform the same manual and tedious repetitive activities for troubleshooting the same or similar alerts, which leads to a loss of time and resource. In many cases, inexperienced users may spend much more time than an experienced user who has encountered a similar issue before.

In addition, there may be many false positive starts for determining the cause of the alert. Thus, each time a different user performs troubleshooting, the user will waste time navigating through these false positive starts, which results in a large mean time to identification (MTTI).

In related systems, there is no alert contextual dashboard available based on historical activities a user has performed to handle a same or similar alert in the past. Accordingly, users can only create static and generic dashboards that are not associated or geared with the alerts. In addition, the related systems can only find correlations between alerted metrics with other metrics within a same device or different devices within the same group. However, these high correlation metrics are not used for dashboard recommendation for future troubleshooting.

Furthermore, creating a specific dashboard to analyze a problem or issue may not actually capture the relevant contextual information as the dashboard is not based on the actual flow traversed by a user while performing the actual troubleshooting. In addition, there is no ability to view the dashboard in the context of a same or similar alerts. Furthermore, static dashboards do not change according to various changes which have occurred in the system that might have changed the cause of the problem even though the problem might have remained the same.

Thus, it may be helpful to track user activities that are performed while troubleshooting an alert. The tracked user activities may be mined, filtered, and correlated to generate a dashboard template without user intervention. The dashboard template may be assigned to the alert cluster in which the alert is associated with. Thus, when the user or a different user troubleshoots a same or similar alert, the dashboard is generated from the dashboard template. In addition, there may be multiple dashboard templates assigned to the alert cluster and, hence, the user can view any one of the dynamic contextual dashboards generated using templates assigned to the alert cluster based on a score assigned each dashboard, which reduces the MTTI.

Aspects of the present disclosure create a more efficient method of troubleshooting alerts using historical data. For instance, users will not need to manually define a static, generalized dashboard. Instead, the present disclosure provides dynamic contextual dashboards that are automatically generated based on tracked metrics. For instance, alert contextual dashboards may be generated using dashboard templates. Accordingly, users may quickly and easily identify a cause of an alert by using the contextual dashboards to track same or similar alerts to reduce mean time to identify (MTTI). By doing so, even basic users may leverage the experience and history of other troubleshooting user activities when identifying a cause of an alert. This in turn significantly reduces troubleshooting and root cause analysis time, avoids incident war room scenarios, and helps users to not only understand what the cause is, but what should be fixed to resolve the issue for good.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing circuitry). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example network system 100 configured to implement one or more techniques of this disclosure. The network system 100 includes networks 110a, 110b, 110c, 110d, and a cloud service 120, variously interconnected through the Internet. The network system 100 may include more networks similar to network A 110a. The networks 110a, 110b, 110c, and 110d may be or include a local area network. The networks 110a, 110b, 110c, and 110d may have a physical layers and transport layers according to IEEE 802.11, Ethernet, or other wireless or wire-based communication standards and protocols. Network A 110a includes at least a firewall 150, a switch 160, servers 140a, 140b, and a client computer 170, which may be IT devices. Network A 110a may include more IT devices. One or more of the IT devices in network A 110a may run a collector routine. Network B 110b includes a server 130b having a monitor service (not shown). Network C 110c and network D 110d include respective servers 130c, 130d having a respective proxy (not shown).

The cloud service 120 is a computing service made available to users on demand via the Internet from a cloud computing provider's servers. The cloud service 120 provisions and provides access to remote devices and systems to provide elastic resources which may scale up or down quickly and easily to meet demand, are metered so that the user pays for its usage, and are self-service so that the user has self-service access to the provided services.

The servers 130b, 130c, 130d, 140a, and 140b are computing devices that utilize software and hardware to provide services. The server 130b, 130c, 130d, 140a, 140b may be server-class computers accessible via the network 140, but may take any number of forms, and may themselves be groups or networks of servers.

The firewall 150 is a hardware or software based network security system that uses rules to control incoming and outgoing network traffic. The firewall 150 examines each message that passes through it and blocks those that do not meet specified security criteria.

The switch 160 is a computer networking device that connects devices together on a computer network by using packet switching to receive, process, and forward data from an originating device to a destination device.

The client computer 170 is shown as a desktop computer, but may take the form of a laptop, smartphone, tablet or other, user-oriented computing device.

Figure 15:
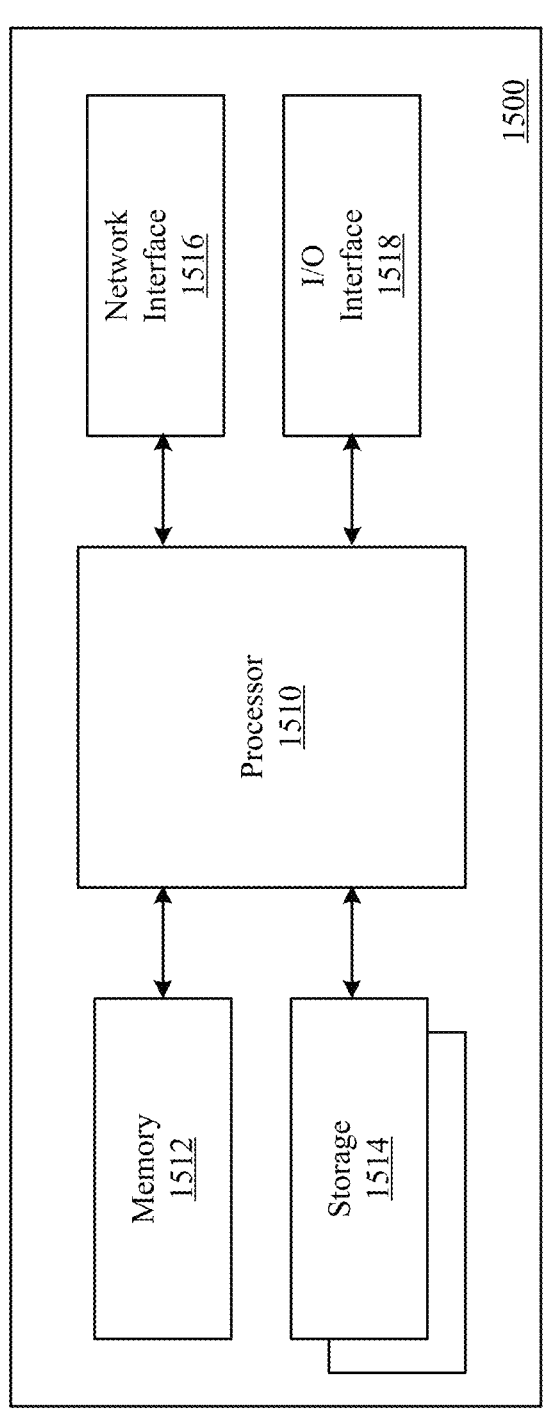
FIG. 15 illustrates a block diagram of a computing device.

The servers 130b, 130c, 130d, 140a, 140b, firewall 150, switch 160 and client computer 170 are IT devices within the system 100, and each is a computing device as shown in FIG. 15. FIG. 15 shows a hardware diagram of a computing device 1500. The computing device 1500 may include software and/or hardware for providing functionality and features described herein. The computing device 1500 may include one or more of: logic arrays, memories, analog circuits, digital circuits, software, firmware and processors. The hardware and firmware components of the computing device 1500 may include various specialized units, circuits, software and interfaces for providing the functionality and features described herein.

As shown in FIG. 1, monitoring solutions collect telemetry data from applications and from switches, routers, firewalls, and other resources. These telemetry data are collected into one repository so a user may run searches on these telemetry data from a single place—rather than logging into different machines to troubleshoot. Many companies are building these platforms as hosted solutions in the cloud, Software as a Service (SaaS) solutions, or an on-premise solution. However, these platforms all generally share a similar troubleshooting process of receiving an alert (event or problem), viewing a generic dashboard for troubleshooting the alert, initiating a troubleshooting alert by visiting multiple metrics and/or correlated metrics, defining the generic dashboard to track the set of metrics and defining the generic dashboard to track the resource or application health, as will be described in more detail below in FIG. 2.

Observability is a description of an overall system. The observability of a system determines how well a user may assess the system's internal state by monitoring the outputs. For example, a developer may use outputs of a system to accurately infer holistic performance of a system. A common way to discuss observability is to break it down into three types of telemetry: metrics, traces, and logs. These three critical data points may be referred to as the three pillars of observability since each of these data points are used to determine when, where, and why a problem has occurred. Accordingly, each of these data points are complementary to each other and, thus, the available of these signals accelerate the troubleshooting process.

Metrics may be a wide range of values, monitored over a period of time. Metrics are often key performance indicators (KPIs) such as central processing unit (CPU) capacity, memory usage, latency, or any other measurement of the health and performance of a system. Changes in metrics allow teams to gain a better understanding of the end performance of the system. For instance, understanding fluctuations in performance over time helps a user better understand the user experience, which in turn helps them improve it. Here, the metrics may be examined to find related alerts metrics, correlated metrics, or to understand configuration.

Logs are historical records of the system that are time-stamped. The logs typically come in either binary or plain text as well as structured logs which combine text and metadata, which makes them easier to query. Logs allow a user to look back and see what has gone wrong within a system. Here, the user may locate logs in order to find relevant log lines that may have caused the alert.

Traces are a way to record a user's journey through an application or system. A trace records a user's interaction and requests within the system, starting from the user interface (UI) through to the back end systems, and then back to the user once their request has been processed. Every operation performed upon the request is recorded as part of the trace. In a complex system, a single request may go through dozens of microservices. For instance, every operation performed from clicking on a tab within an application to the tab loading in the GUI is recorded as part of the trace. Each of these separate operations, or spans, contains crucial data that becomes part of the trace. For instance, traces are critical for identifying bottlenecks in systems or seeing where a process broke down within the application or system.

Combining metrics, logs, and traces from a variety of sources into a single platform allow users to collaborate more effectively to see a big picture view and achieve greater visibility into systems when troubleshooting. This allows a reduction of MTTR and provides a more collaborative way to develop, deploy, and iterate on systems and applications.

Before resolving and responding to an alert, a user must first identify the issue causing the alert. Alerts do not always provide the entire picture and, instead, should be used as an indication that further investigation is needed into the component that generated the alert. A great place to start investigating alerts are dashboards since dashboards may help pinpoint a root cause.

FIG. 2 illustrates example method of troubleshooting alerts. Specifically, FIG. 2 shows a method 200 for troubleshooting alerts using dashboards or alerts without context process.

At step 202, the method 200 includes a user (or operator) logging on to a generalized dashboard. Dashboards may allow users to build customized, strategic views of systems. For example, dashboards may be used to provide a high level view of infrastructure performance, comprehensive view of application status, centralized metrics for cloud, hybrid, and virtualized infrastructures, or a scratchpad of pinned instance widgets for root cause analysis. Accordingly, a generalized or generic dashboard may display CPU utilization, aggregated CPU utilization, database host, aggregated number of connections, etc. to view the health of a system.

Generally, a dashboard may be a collection of widgets. Widgets may be added to dashboards to enable a display of individual metrics, aggregate values, trends, statuses, relational values, and more. In this disclosure, the dashboard may focus on widgets such as alert widgets, alert list widgets, or metric widgets since these widgets involve highlighting metrics that are causing issues.

At step 204, the method 200 includes the user viewing the generalized dashboard and alert view for troubleshooting an alert. The alert (e.g., anomalies, alert, or incident) may be generated from a variety of components in a platform such that the alert may be on a particular node, an application, or a resource. For example, the alerts may arise from system tasks, resources, database queries, applications, and so forth. In addition, multiple alerts may arise due to a single problem. However, correlating these alerts to find a root cause manually is time-consuming and costly. In addition, the alert may be part of an alert cluster due to the similarity between the alerts in the cluster.

At step 206, the method 200 includes the user initiating troubleshooting the alert by visiting multiple metrics and/or correlated metrics to the alert. The user may traverse through different entities such as time series graphs, related alerts, multiple alerts, multiple log patterns mined via queries, application interactions via topology, and traces between applications and query trace patterns (e.g., troubleshooting flow) to identify the root cause of the alert. However, since there is no way of tracking troubleshooting activities in the context of alerts, the user must perform these activities again when troubleshooting same or similar alerts.

At step 208, the method 200 includes the user manually defining the generalized dashboard to track the set of metrics capturing the alert cause. However, this is a painful process and may lead to a sprawl of the dashboard. In addition, this process is difficult to manage.

At step 210, the method 200 includes the user manually defining the generic dashboard to track the resources and application health. However, this generic dashboard will not capture troubleshooting aspects.

In these related systems, there is no way to generate a dashboard based on historical activities that the same user or other users have performed to handle an alert in the past. Due to the lack of history, the user may only create a static and generic dashboard that is not associated with alerts.

As an example, at a point in time, there may be a multiple users logging into a system and a database connection may begin exhausting. The alerts may not be occurring on the same node, but these two entities are related either by a direct or indirect relationship, topology, same group, or some other aspect such that a user may receive an alert on a database stating that CPU is high due to the number of connections being high. As such, the user wants to discover the cause of the alert. The user may begin troubleshooting and realize that the alert is due to the large number of users logging onto the system. The user will then create a dashboard for this alert which contains database metrics and a number of user metrics and host metrics such as CPU metrics. However, this problem only captures a single isolated use case. Now, if a user wants to monitor or troubleshoot multiple similar kinds of alerts or a different user is monitoring a similar alert, the user will need to go through the same workflow of troubleshooting, which increases the MTTI of the cause of the problem. In addition, since each user generates a dashboard for each problem instance, there may be a separate dashboard each time the alert occurs. Thus, it is difficult for the user to identify which dashboard to view next time the user encounters a same or similar alert.

As described herein, aspects of the present disclosure focuses on creating dashboard templates by tracking and capturing alert troubleshooting user activity performed while identifying the cause of an alert. This allows the system to create dashboard template and assign them to an alert cluster related to the alert such that the next time a similar alert occurs, the system may provide a dashboard generated from the relevant dashboard template for the alert as a starting point for troubleshooting. In addition, since there is no way of knowing the resources related with a new alert when a user receives a new alert or event, the system generates the template by removing the resources context and later uses the template to generate a dashboard in context of resources related to a new alert because that alert may be related to a problem caused on a different resource.

Specifically, an alert contextual dashboard of a similar or same alert may be automatically generated in the background to reduce the MTTI the alert cause using the available dashboard template.

Figure 3:
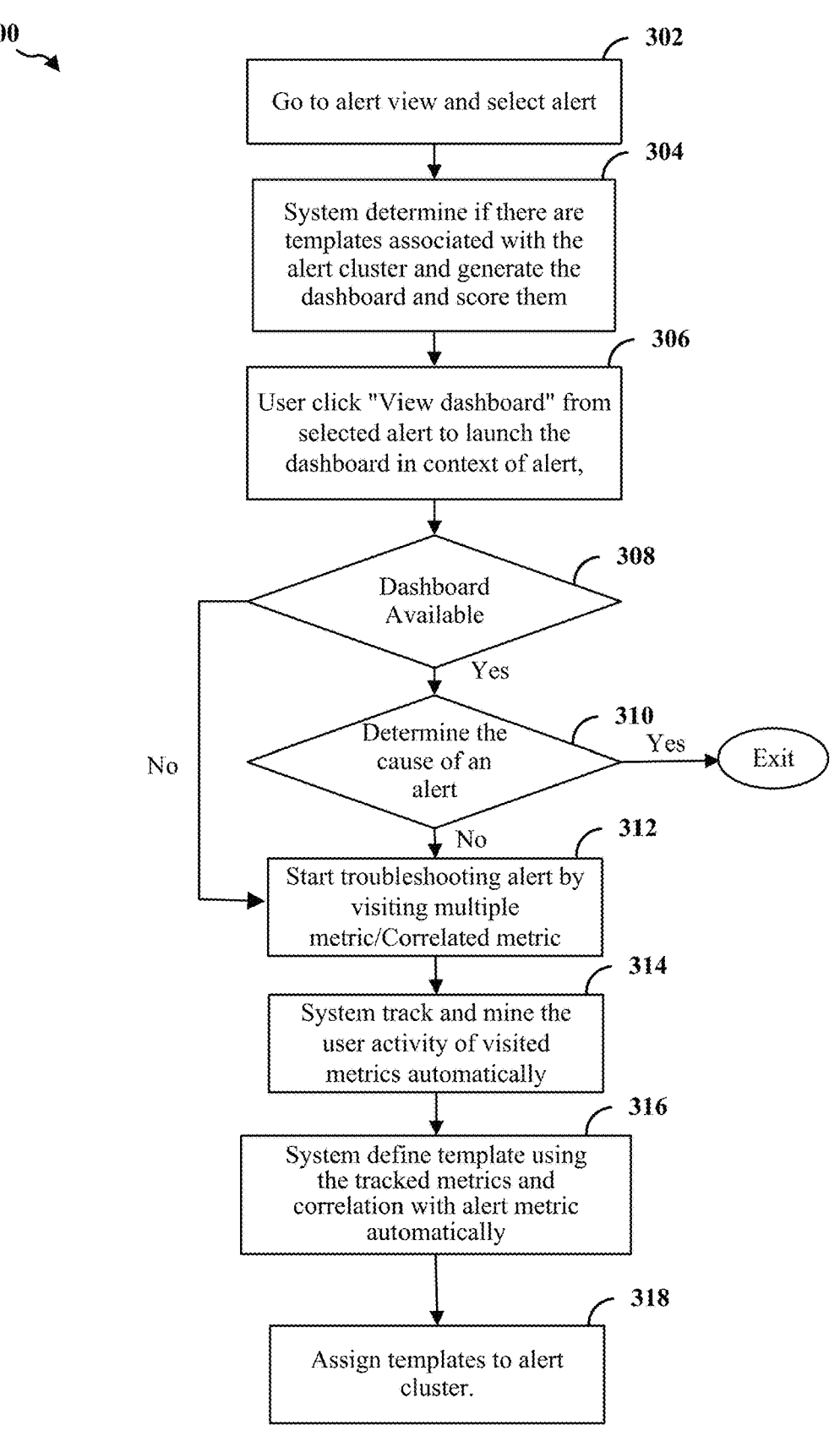
FIG. 3 illustrates an example flowchart of an example method of troubleshooting via dynamically generated dashboard in context of the alert in accordance with one or more techniques of this disclosure.

FIG. 3 illustrates a flowchart of an example method for troubleshooting alerts. In contrast to FIG. 2, FIG. 3 shows a method 300 for troubleshooting alerts via dynamically generated dashboards in context of alerts. In addition, unlike the method 200, the method 300 does not include any steps of generating a dashboard or manually scoring the dashboard by the user. Instead, the user may follow the method 300 to determine whether any available dashboards help to determine the cause of an alert. In addition, if the available dashboard does not help identify the cause of an alert, then the user may troubleshoot and the troubleshooting workflow is captured in the back end. The method 300 describes using alert context dashboards of a similar or same alert to identify an alert cause using available dashboard templates. In addition, the method 300 also describes a method of creating dashboard templates by tracking and capturing alert troubleshooting user activities performed for identifying the cause of an alert.

At step 302, the method 300 includes a user navigating to an alert view and selecting an alert.

At step 304, the method 300 includes the system determining if there are templates associated with the alert cluster that the alert (or event) belongs to, and generates the dashboard and scores the dashboard.

At step 306, the method 300 includes the user launching the dashboard in the context of an alert. For example, a user may click "view dashboard" from the selected alert to launch the dashboard.

At step 308, the method 300 includes the system determining whether a dashboard is available.

If it is determined that a dashboard is available, then, at step 310, the method 300 includes the user determining if he is able to determine the root cause of an alert using the dashboard. If the user is able to determine the root cause of the alert, then the method 300 ends.

If it is determined that a dashboard is not available, then, at step 312, the method 300 includes user starting to troubleshoot the alert by visiting multiple metrics and/or correlated metric.

At step 314, the method 300 includes the system tracking and filtering the user activity of visited metrics automatically. In some examples, the tracked activities are mined, filtered, and correlated to generate a dashboard template in an automated way.

At step 316, the method 300 includes the system defining template using the tracked metrics and their correlation with alert metric automatically.

At step 318, the method 300 includes the system assigning templates to an alert cluster. The template may be used for generating dashboard for alerts associated with the alert cluster. In some examples the dashboard template may be assigned a score. In this way, the next time a user troubleshoots the same or similar alert, a dashboard may be generated from the template. In some examples, there can be multiple templates assigned to the alert cluster. This allows the user to choose to view any one of the dashboards assigned to the alert based on the score assigned to dashboards to reduce MTTI.

Thus, unlike the method 200, the method 300 does not involve the user manually creating a dashboard or a generic dashboard. Instead, an alert contextual dashboard is automatically created in the backend by using the correlation of tracked metrics with alert metric, correlation of the scoped metrics with alert metric of same of similar alert, and then providing the context to the dashboard template. This allows tracking of the user activities performed during troubleshooting the alert, capturing the tracked metrics as a template and using the template to generate the alert context dashboard.

Figure 4:
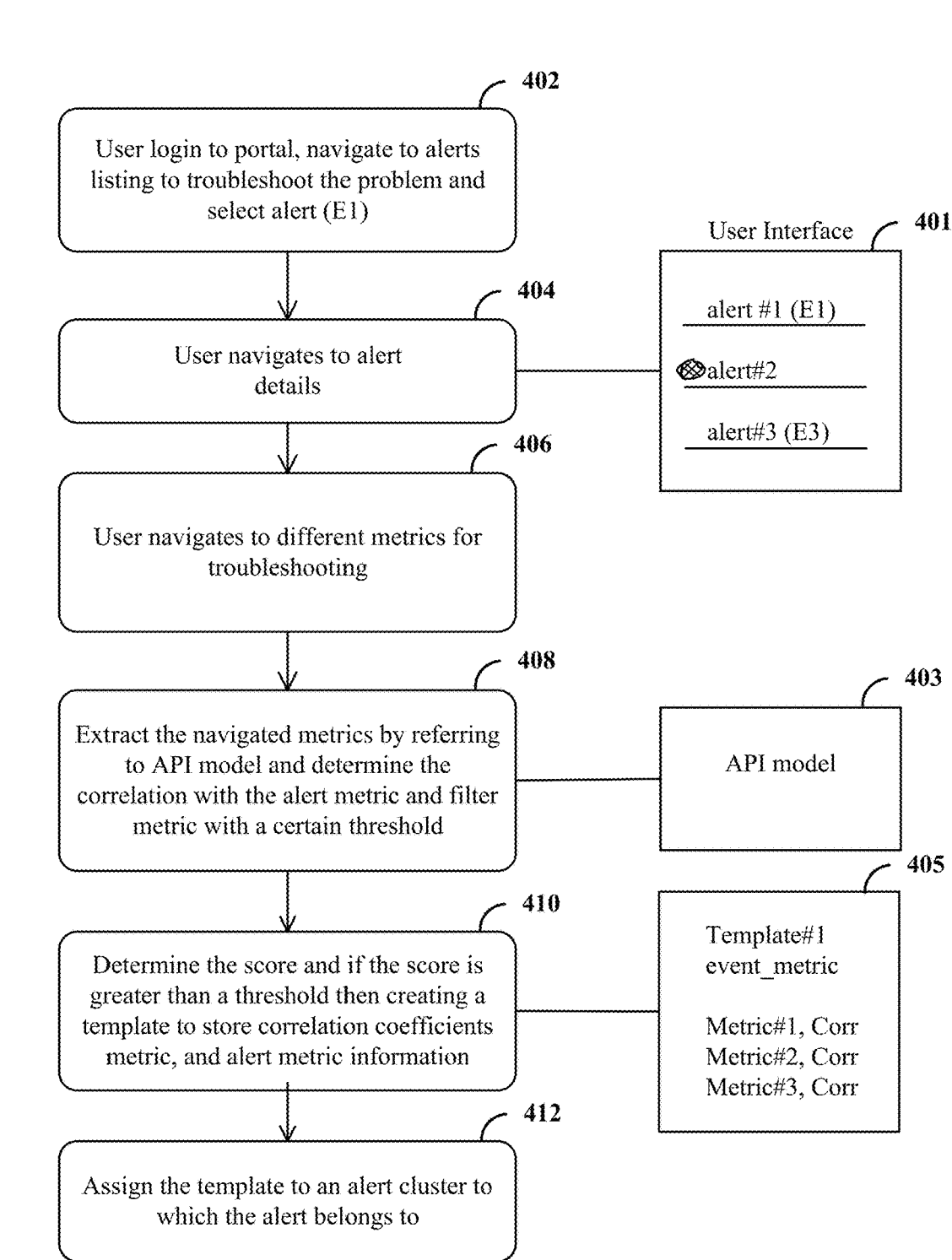
FIG. 4 illustrates an example flowchart of an example method of generating dashboard templates using metric correlation and assigning to an alert cluster in accordance with one or more techniques of this disclosure.

FIG. 4 illustrates a flowchart of an example method of generating a dashboard template using metric correlation and assigning the dashboard template to an alert cluster.

At step 402, the method 400 includes a user logging in to a portal, navigate to alerts listing to troubleshoot the problem and select alert (E1)

At step 404, the method 400 includes user navigating to alert details. As shown in the UI 401, there is a listing of three alerts.

At step 406, the method 400 includes the user navigating to different metrics for troubleshooting. Accordingly, when the user navigates on the UI 401, the user will go to multiple metrics of a same resource or a multiple resource dependent resource. At the same time, the system tracks those APIs using an API call that is initiated in the back end. The API call initiated for the user activity may be stored in logs or a database.

At step 408, the method 400 includes the system extracting the navigated metrics by referring to an API model 403 and determine the correlation with the alert metric and filter the metric with a certain threshold (a). The API model 403 may be associated with a list of API to scan. For example, a user may use N number of APIs based on a number of navigations during the troubleshooting. The API model 403 is important since the user is only interested in a set of APIs and is concerned with the metrics in the API model. In addition, logs and traces may be part of the API model. 403. Accordingly, the API model lists the APIs to scan or mine from the logs. This allows tracking and correlation of the metrics which were tracked such that metrics which are plus or minus correlated within a certain threshold with the alert metrics are extracted.

At step 410, the method 400 includes the system determining a score for the template and if the score is greater than a threshold (1) then creating a template 405 to store correlation coefficients, metrics, and alert metric information. As an example, the template 405 may have a format that includes an alert metrics and a set of metrics and their correlation.

At step 412, the method 400 includes the system assigning the template to an alert cluster to which the alert belongs to. This allows the template to be used for dashboards in the context of a same or similar alerts in the future.

FIG. 5 illustrates a flowchart of an example method of generating a dashboard template. As compared to FIG. 4, FIG. 5 shows a different method 500 of generating the dashboard template.

At step 502, the method 500 includes identifying an alert. An alert data consists of a metric indicating the problem. For example, there may be an alert on a resource CPU metric or resource memory metric, database connection metrics, etc.

At step 504, the method 500 includes finding the resources and metrics (M) of the alert.

At step 506, the method 500 includes a user navigating different API for troubleshooting alert.

At step 508, the method 500 includes determining whether navigated API has metrics information.

If it is determined that the navigated API has metric information, then, at step 510, the method 500 includes tracking the metrics that the API navigated (e.g., M1, M2, . . . Mn)

At step 512, the method 500 includes determining whether user has navigated more APIs. If it is determined that the user has navigated more APIs then, the method 500 includes returning to step 506. If it is determined that the user has not navigated more APIs, then, at step 514, the method 500 includes calculating coefficient correlation.

At step 516, the method 500 includes storing metric and metric (p) correlation coefficient where metric (p) correlation coefficient greater than positive (a) threshold or smaller than negative (a) threshold and a number of times trouble-shooting metrics API hits. The metric stored in the template are either highly positively correlated or highly negatively correlated to capture the cause.

At step 518, the method 500 includes storing relevant navigated metrics as a template in the context of alert metrics.

At step 520 the method 500 includes assigning template to alert cluster of alerting metrics.

Figure 6A:
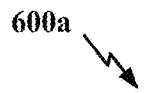
FIG. 6A illustrates an example of a template format in accordance with one or more techniques of this disclosure.

FIG. 6A illustrates an example 600*a* of a template format. Specifically FIG. 6 shows a format of a dashboard template.

FIG. 6B illustrates an example 600*b* of a dashboard template. Specifically FIG. 6B shows a dashboard template generated by traversing and tracking metrics from logs and mining the API defined by the API model.

As shown in the example 600*b* of FIG. 6B, a dashboard template is created for a KafkaConsumer with an alert metric of a "consumerLag." Kafka is a queue system where an application inputs messages in a queue and the queue consumes from it. As an example, the issue related to Kafka may be related to three reasons (CPUUsage, heap, connectionUsage) that have increased. Accordingly, these three metrics are visited. As shown in FIG. 6B, the metrics that were visited include graph metrics from Java Thread & up time for cpuUsage, heap, and cpuUsage, and graph metrics from MySQL for connectionUsage and abortedConnection. In this example, the correlation coefficient threshold is +/−0.7 and, accordingly, only the metrics that are higher than the threshold of +0.7 or smaller than −0.7 are included in the template.

Once the dashboard template is generated and attached to an alert cluster, then the dashboard templates may be used to create the dashboard dynamically for the alert belonging to the cluster for which the operator wants to troubleshoot.

Figure 7:
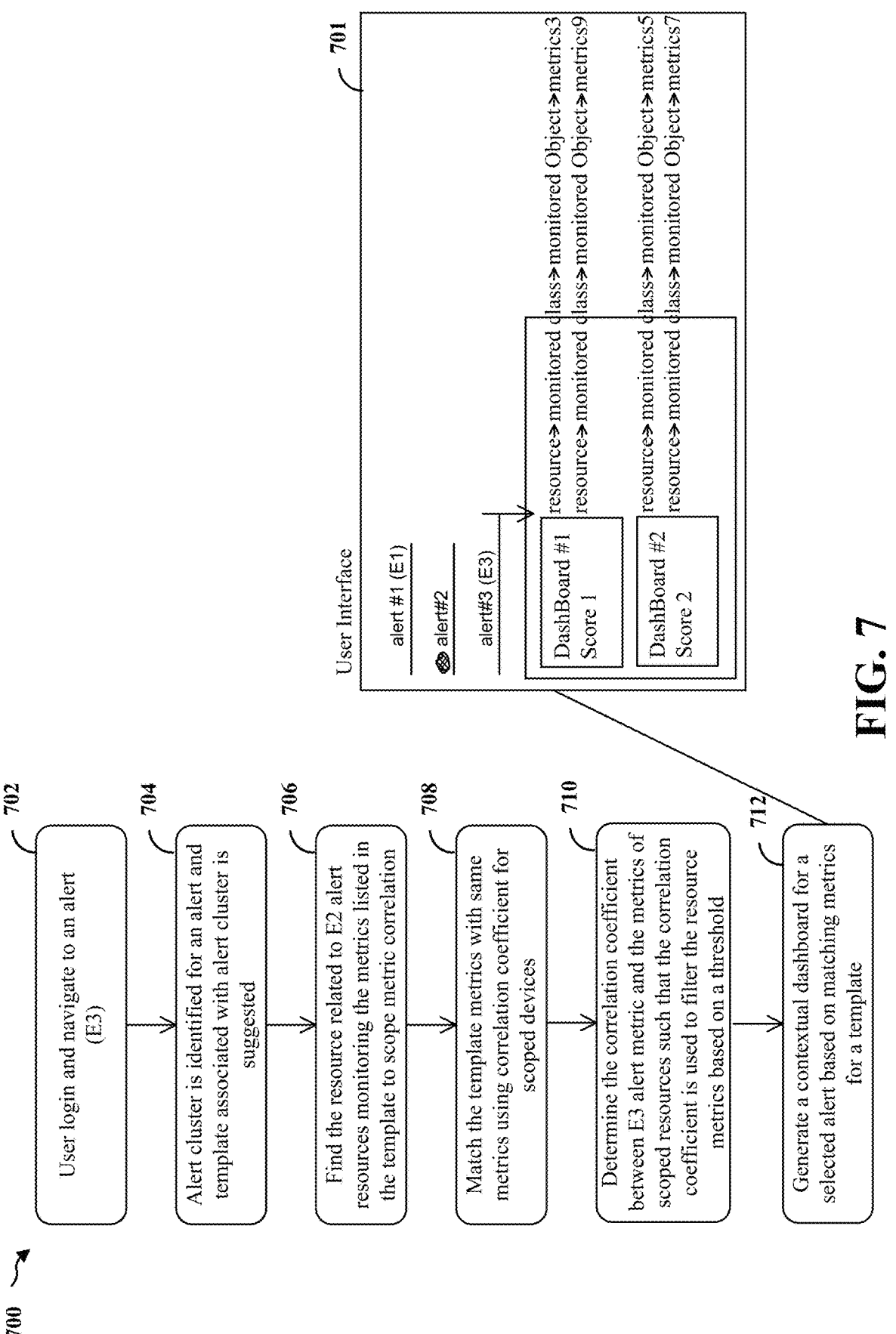
FIG. 7 illustrates an example flowchart of an example method of generating a dynamic contextual dashboard from the dashboard template in accordance with one or more techniques of this disclosure.

FIG. 7 illustrates a flowchart of an example method 700 for generating dashboards from the dashboard templates. This is an important aspect because the method 700 gives context to a dashboard template and creates a dashboard.

At step 702, the method 700 includes the user logging in to a portal and navigate to an alert. As an example, the user may navigate to an alert (E3).

At step 704, the method 700 includes identifying an alert cluster for an alert and suggesting a template associated with the alert cluster.

At step 706, the method 700 includes finding the resources related to the alert resource, which are monitoring the metrics listed in the template to scope metric correlation. In some examples, all related resources to the alert resource may be found. There may be multiple ways of finding the related resource to the alert resource. For example, if the alert has occurred on the resource, R1, and there are 10,000 resources within the system, then the correlation should not be run across the metrics on the 10,000 resources. Instead, the resource to which this alert resource is related should be scoped. It can either be scoped through a group, or a direct or indirect relationship.

At step 708, the method 700 includes matching the template metrics with the same metrics using correlation coefficient for scoped devices. In some examples, the template metrics is matched with the scoped resources and correlation for a new resource, alert metric on new alert corresponding to the new resource, and graph metric of related resources for the new alert is calculated. For example, while creating the template dashboard, since there is a correlation for the new device, the new alert, and all related resources for this alert, there is correlation on both ends. Accordingly, a coefficient index score with a same metrics for the scoped devices can be determined. There is scoring for the template, the correlation coefficient for the dashboard, and correlation coefficient for the template. Accordingly, if the two correlations are highly correlated and there may be a high score and if the correlations are loosely correlated then the correlations may have a large gap and a low score.

At step 710, the method 700 includes determining the correlation coefficient between E3 alert metric and the metrics of scope resources such that the correlation coefficient is used to filter the resource metrics based on a threshold.

At step 712, the method 700 includes generating a contextual dashboard for a selected alert based on matching metrics for a template.

As shown in the UI 701, there are three listed alerts and two dashboards corresponding to a selected alert (e.g., alert #2). Specifically, the UI 701 shows three metrics: monitored class, monitored object, and metrics associated with a resource and a related score.

The present disclosure shows how a dashboard template may be converted into dashboards by having context of the resources related to the alert for which the dashboard may be shown and related scores assigned to the dashboards.

Figure 8:
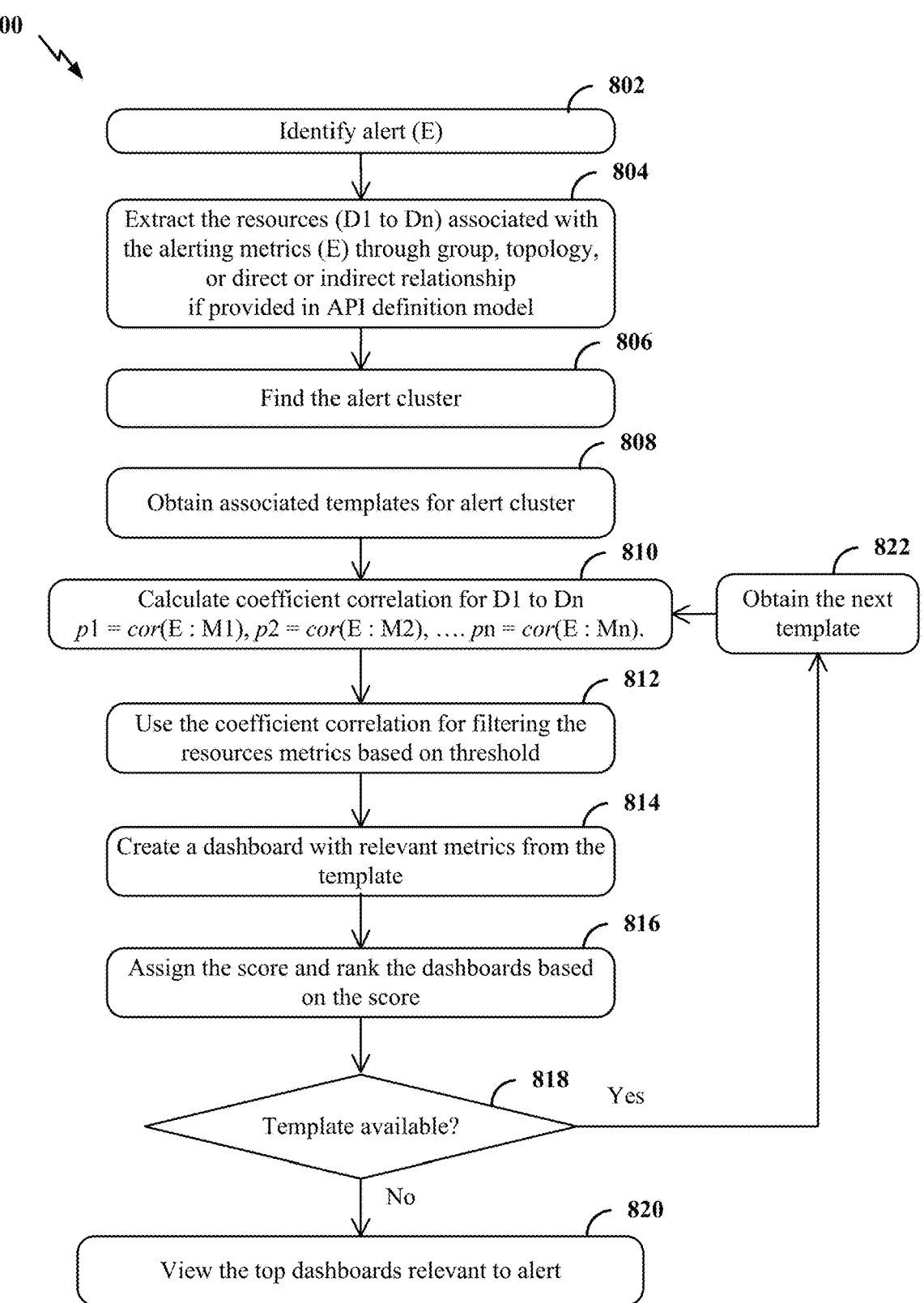
FIG. 8 illustrates an example of generating a dynamic contextual dashboard in accordance with one or more techniques of this disclosure.

FIG. 8 illustrates a flowchart of an example method 800 of generating a dashboard. As compared to FIG. 7, FIG. 8 shows a different method 800 of generating a dashboard.

At step 802, the method 800 includes identifying an alert.

At step 804, the method 800 includes extracting the resources (D1, D2, . . . Dn) associated with the alerting metrics through group, topology, or a direct or indirect relationships if provided in API definition model. The API definition model takes an alert and a resource associated with the alert and uses the API definition model to extract all other related devices.

At step 806, the method 800 includes finding the alert cluster.

At step 808, the method 800 includes obtaining associated templates for alert cluster.

At step 810, the method 800 includes calculating coefficient correlation of alert metric and metric matching in the selected template for resources D1 to Dn.

At step 812, the method 800 includes using the coefficient correlation for filtering the resources metrics based on a threshold.

At step 814, the method 800 includes creating a dashboard with relevant metrics from the template.

At step 816, the method 800 includes assigning the score and ranking the dashboards based on the score.

At step 818, the method 800 includes determining whether a template is available.

Based on a determination that a template is available, at step 822, the method 800 includes obtaining a next template.

Based on a determination that a template is not available, at step 820, the method 800 includes viewing the top dashboards relevant to alerting alert.

A user (or operator) is alerted when a problem is observed due to a metric threshold violation. The user may log into the system to attempt to identify the problem scope and determine the root cause via troubleshooting. In order to troubleshoot, the user navigates resources and looks at specific time series to identify patterns which may provide an indication or cause of a problem. These navigation steps generate API calls to backend systems which get recorded in logs or any other storage method. The user activities are automatically tracked in the backend. By this way, the user may reach or root cause or identify a problem scope.

The user may find the root cause while navigating the different entities and reducing the scope on the entities via a search query or relationship traversing based on the connected resources' cause or impact, which is captured as the user activity is translated to API calls in the log files.

Figure 9:
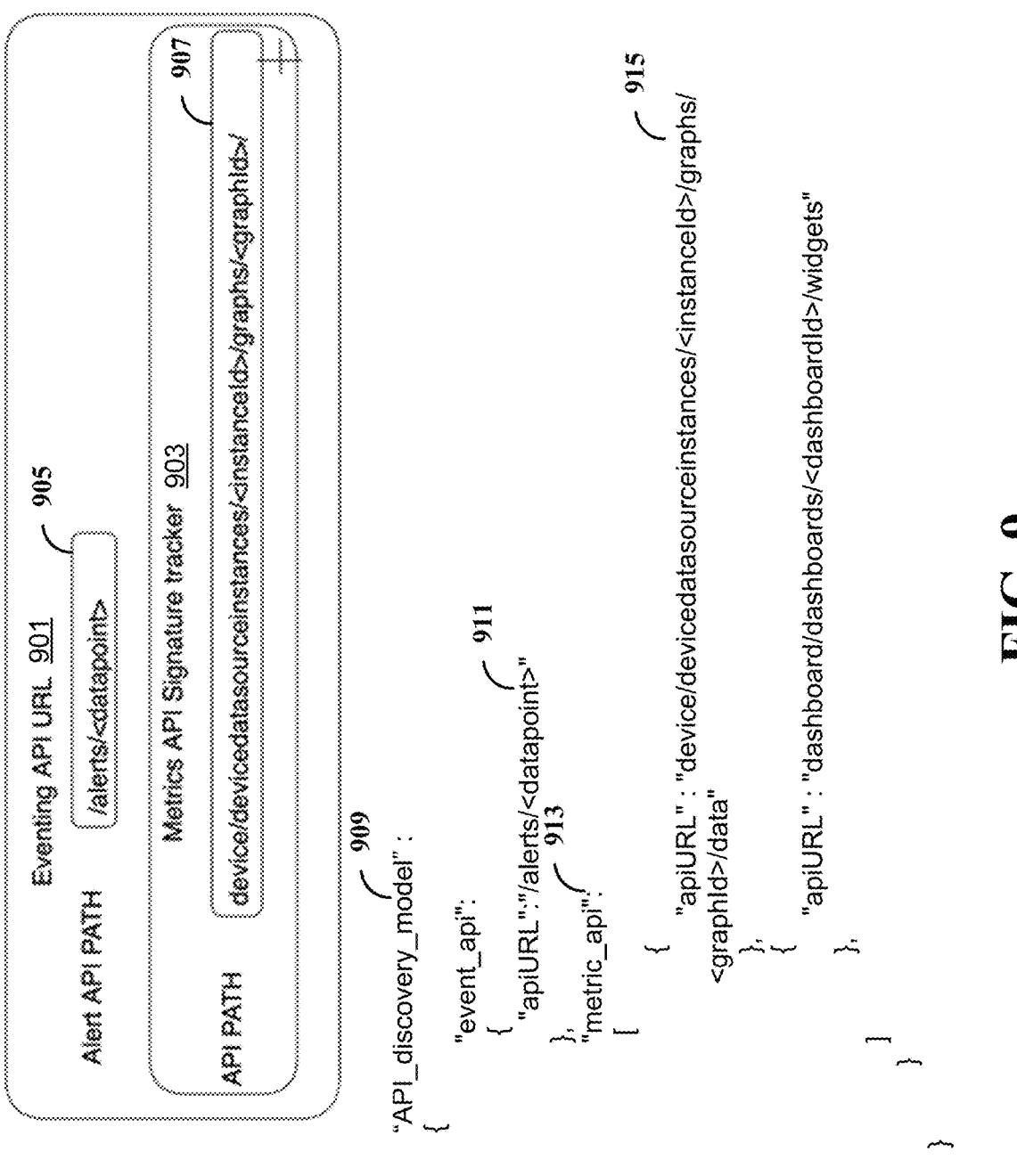
FIG. 9 illustrates an example of an API discovery model in accordance with one or more techniques of this disclosure.

FIG. 9 illustrates an API discovery model. The system captures APIs to be mined from logs to find all the metrics navigated via API Discovery Model. In this way, the relationships of a particular alert host may be associated with other resources.

As shown in the example 900 in FIG. 9, the Eventing API URL 901 may contain a list of API to mine from the logs. Without the list of APIs, the logs will contain a lot of APIs, which are not relevant for this context and in the context of troubleshooting. Specifically, the Eventing API URL 901 may have an Alert API Path that corresponds to an alert datapoint 905. In addition, the Eventing API URL 901 may have a Metrics API Signature tracker 903 that includes an API PATH 907 listing the APIs to traverse which will provide graphs, metrics, resources, and other items that are part of the path.

As an example, the API discovery model may be set up such that the APIs from the API PATH 907 are mined at regular intervals (e.g., every 'X' hours). This means that after each mining session, a new dashboard template will be identified.

FIG. 9 also shows an API discovery model 909 which lists the API URL 911, related metrics 913, and devices 915. The system may analyze the application and/or server logs every 'x' hours and identify the alert API and metric API in the logs and extract associated alert metric and graph metrics based on the discovery model. Furthermore, the alert metrics and graph metric correlation coefficient may be calculated by: Correlation coefficient=correlation formula (event_metric_timeseries, graph_metric_timeseries, event_timestamp_range)

The alert metric, graph metric, and correlation between alert metric and graph metric are used to create the dashboard template. The cluster membership of an alert may be determined via the alert metric attribute, which can be any attribute, and the template is associated with the alert cluster.

As discussed above in FIGS. 3-5 and 7-8, the user may log in to a monitoring or troubleshooting portal and navigate to alerts to troubleshoot the alert. An alert device may be extracted from the alert and the devices having relationships via group or topology dependencies are determined to reduce the scope for the dashboard creation from the template. The system may work with or without scope reduction.

FIG. 10 illustrates an API discovery model. Specifically FIG. 10 shows the APIs to determine the alert metric device group, topology map, or direct or indirect relationship of which the alert metric device is a member is a part of the API discovery model. Since there are different APIs, there should be a way to define the different APIs and to generate a corresponding dashboards based on the different APIs. The API model may be devised by a user, customer, or a vendor.

As shown in FIG. 10, the Eventing API URL 1001 includes an Alert API Path that corresponds to an alert datapoint 1007. In addition, the Eventing API URL 1001 may also have a Metrics API Signature tracker 1003 that includes an API PATH 1009 listing the APIs to traverse for providing graphs, metrics, resources, and other items that are part of the path and a Group Mapping 1005 that includes an API path 1011 listing the devices having relationships via group or topology dependencies. Although, two APIs (Metrics API Signature tracker 1003 and Group Mapping 1005) are shown here, there can be any number of APIs.

FIGS. 11A-11F show a process of creating multiple dashboard templates from an alert for a same or similar problem type. If a new alert generation is identified, then a new dashboard may be created because it actually relates to a different problem statement since it is solving a different problem.

FIG. 11A shows an example 1100A of an alert cluster. Multiple dashboard templates may be created from an alert for the same "problem type." Even clustering may be performed to group similar alerts based on the different attributes, content, and labeled via topic modeling or classification machine learning techniques. As shown in FIG. 11A, a new dashboard template is defined for an alert having a problem type: "Kafka Lag."

Figure 11B:
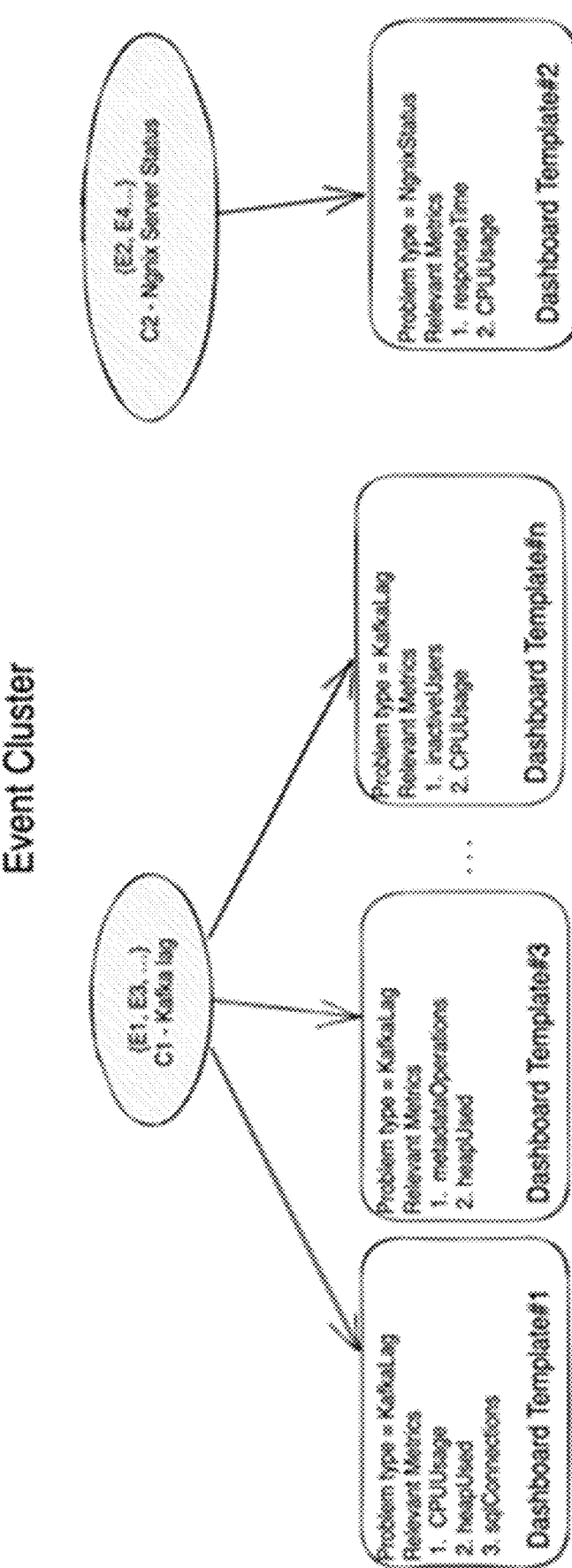
Figure 11C:
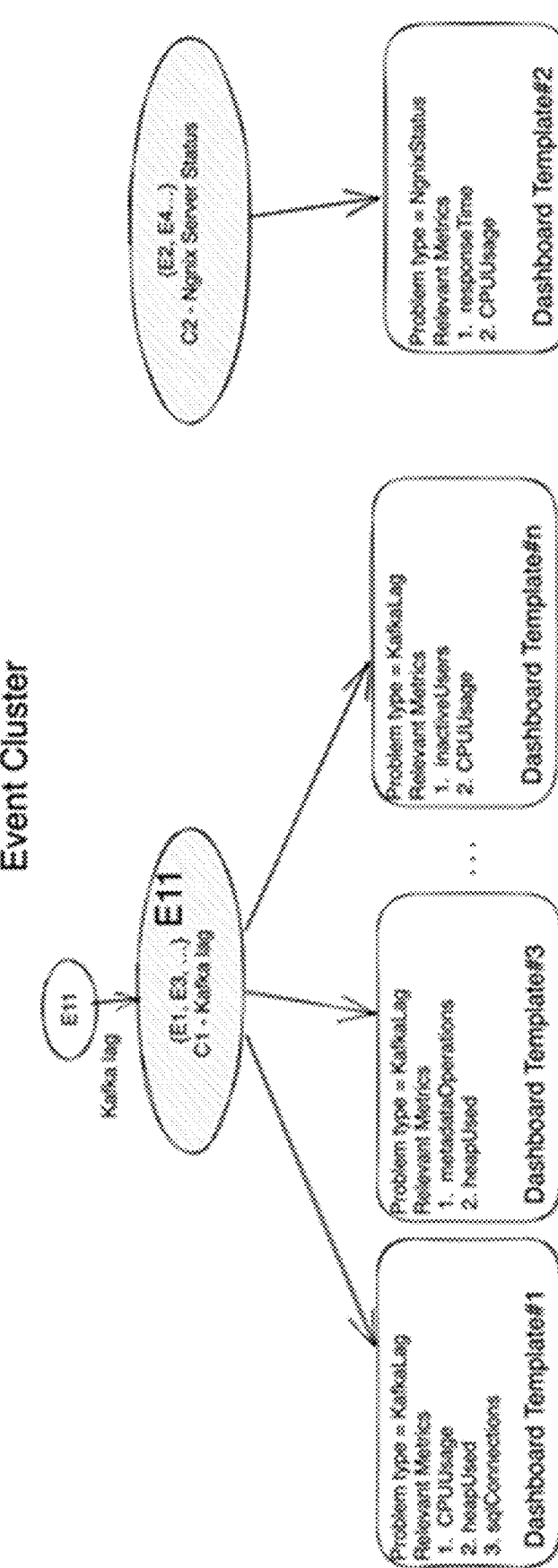

FIG. 11B shows an example 1100B of an alert cluster with multiple dashboard templates associated with a same or similar issue. For each cluster, one or more multiple dashboard templates may be attached based on the "problem type" of an alert and alert cluster. The user may view the already available dashboard based on the template. In some cases, if the already available dashboard does not provide the relevant information, then the user may initiate troubleshooting by exploring various metrics and dependencies, which may be captured in the application log. As shown in FIG. 11B, there are already available dashboard FIG. 11C shows an example 1100C of associating an alert with an alert cluster. Specifically, FIG. 11C shows a user troubleshooting an alert E11 (e.g., alert) using the troubleshooting dashboard attached to the cluster "C1" as the alert "E11" is related to a Kafka lag and the alert cluster "C1" is associated with Kafka Lag.

FIG. 11D shows an example 1100D of dashboard templates. As shown in FIG. 11D, the metrics from template #1 1101 are correlated with alert metric E11. This process may be repeated for all templates associated with the cluster C1 and relevant dashboards are generated.

The scoring of the dashboard is determined by averaging the absolute correlation coefficient value for all the metrics in the dashboard and the dashboard having the score greater than a specified threshold will be shown to the end user.

FIG. 11E shows an example 1100E of dashboards generated for the alert cluster according to an alert. In this example, the score threshold is 0.6, which means that any template having score below the threshold would be irrelevant. The dashboard scoring is then calculated by averaging the correlation coefficient absolute value of all metrics in the template.

Specifically FIG. 11E shows an example 1100E of two dashboards 1107, 1109 generated in context of alert Event 11 since the dashboard template threshold is 0.6, a first dashboard 1107 generated based on template #1 1101 and a second dashboard 1109 generated based on template #n 1105 are the most relevant and are ranked according to score. As shown in the example 1100E, an alert operator may view a dashboard generated from template #1 and template #n for alert Event E11 because the threshold is set to 0.5. Accordingly, the first dashboard 1107 is ranked #1 and the second dashboard 1109 is ranked #2 based on the template scores.

Figure 11F:
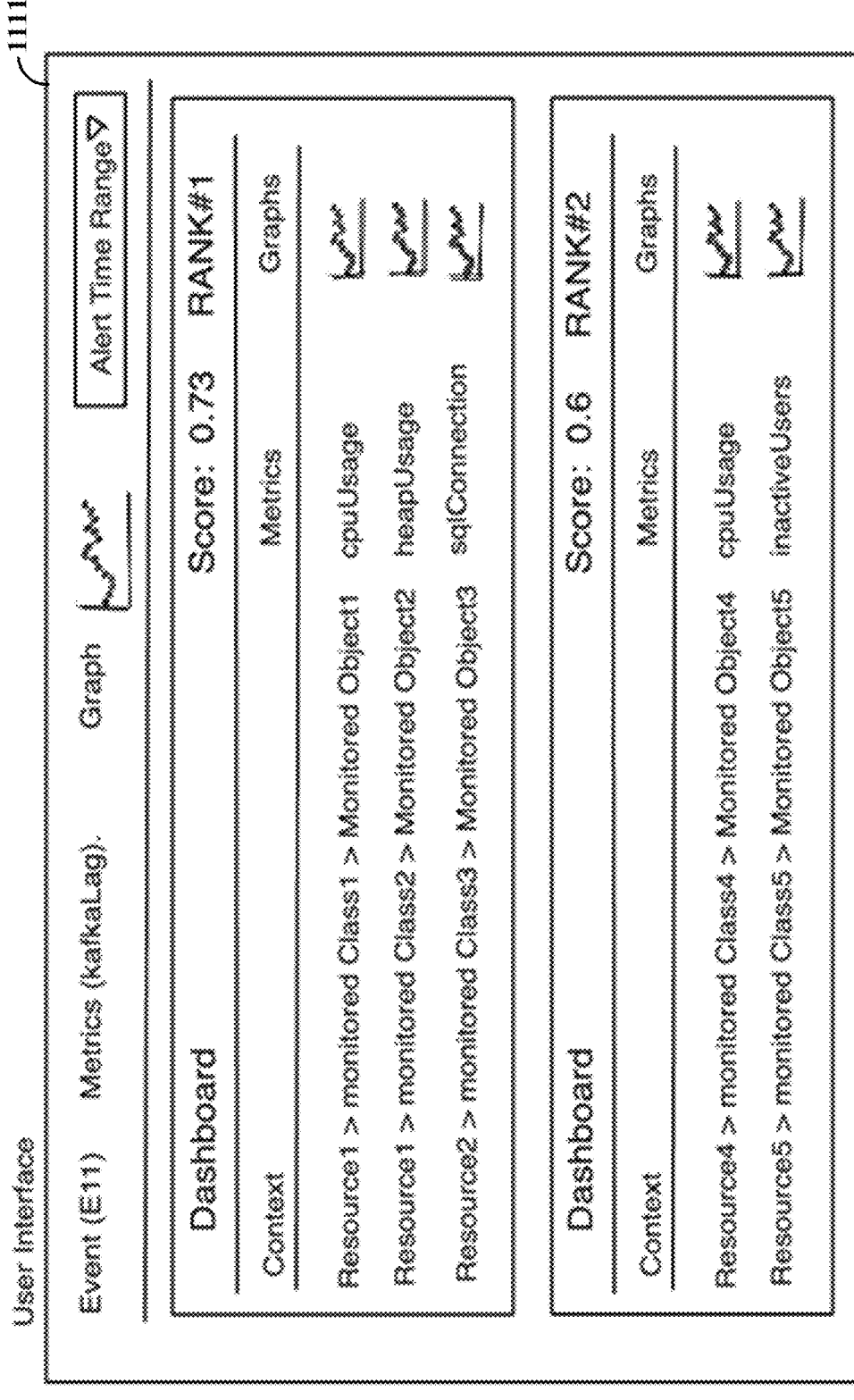

FIG. 11F shows an example 1100F of UI of a dashboard generated from templates for the alert. The user will be to view a UI 1111 displaying dashboards 1107, 1109 generated from template #1 1101 and template #n 1103, respectively.

FIG. 12 illustrates a flowchart of an example method for generating a dynamic contextual dashboard based on a dashboard template for troubleshooting an alert in accordance with one or more techniques of this disclosure. The method 1200 may be performed by an apparatus, such as the client computer 170, as described above, or the computing device 1500, as described below. In some implementations, the method 1200 is performed by processing logic, including hardware, firmware, software, or a combination thereof. In some implementations, the method 1200 is performed by a processor executing code stored in a non-transitory computer-readable medium (e.g., a memory). Optional aspects are illustrated in dashed lines. The method 1200 includes generating a dynamic contextual dashboard based on a dashboard template for troubleshooting an alert.

At block 1202, the method 1200 includes identifying an alert among a listing of alerts for troubleshooting the alert. As example, a CPU alert may be generated and there may be multiple alerts on the alert view. However, a user may want to troubleshoot the highest severity issue, which is a CPU alert. For example, referring back to FIG. 4, the user may select an alert among a listing of alerts displayed in a UI 401.

At block 1204, the method 1200 includes generating a dashboard template for the alert by tracking and capturing user activities performed while troubleshooting the alert. In some examples, the dashboard template stores alert metric information and alert metrics and corresponding correlation coefficients for each graph metric. For example, referring back to FIGS. 6A-6B, example 600*a* shows an example of a dashboard template format and example 600*b* shows an example of a dashboard template with alert metric information and alert metrics and corresponding correlation coefficients for each graph metric.

In some examples, the dashboard template stores alert metric information and metrics and corresponding correlation coefficients for each metric. For example, referring back to FIG. 6B, the example 600*b* shows alert metric information for the metrics visited along with alert metric information, metrics, and corresponding correlation coefficients for each metric.

In some examples, tracking and capturing the user activities performed further comprises: monitoring alert details associated with the alert, monitoring different metrics navigated by a user, and obtaining the API calls initiated for the user activities from the log files. In some examples, the different metrics navigated by the user are tracked as API calls in log files. In some examples, the dashboard template is generated by mining, filtering, and correlating the tracked user activities without intervention by a user. In some examples, the dashboard template is generated by mining, filtering, and correlating the tracked user activities without user intervention. In some examples, the method 1200 further comprises mining the tracked user activities at a regular time period based on a discovery model that identifies an alert API and metric API in logs to extract associated alert metric and graph metrics. In some examples, the method 1200 further comprises determining an alert metric and a graph metrics correlation coefficient. In some examples, the method 1200 further comprises generating the dashboard template based on the alert metric, the graph metrics, and correlation coefficient between the alert metric and the graph metrics.

In some examples, the method 1200 includes extracting navigated metrics by referring to an API model. In some examples, the API model may be associated with a list of API scans. In some examples, the API model comprises API listing to navigate metrics, logs, and traces. For example, referring back to FIG. 4, the API model 403 may contain a list of API scans. As another example, referring back to FIG. 10, example 1000 shows an API model with two API scans (e.g., Metrics API Signature tracker 1003 and Group Mapping 1005).

At block 1206, the method 1200 includes assigning the dashboard template to an alert cluster. The reasoning behind using an alert cluster is for using a same dashboard template for a same or similar alerts in the future. As an example, if a different user comes in and is attempting to troubleshoot the same alert, then using a dashboard template eliminates some of the initial pain that the original user went through because the system can now generate a dashboard based on historical knowledge from other operators. The new user does not need to use the dashboard template, but, the dashboard template is a good starting point to see if it will work for his alert or not. In some examples, the alert belongs to the alert cluster. In some examples, the alert cluster is determined based on an attribute or description of the alert.

In some examples, the method 1200 includes performing alert clustering to group similar alerts based on different attributes or contents and labeling the similar alerts via topic modeling or classification machine learning techniques. As an example, referring to FIG. 11B, example 1100B shows dashboard templates #1, dashboard template #3, . . . dashboard template #n grouped together to a cluster (C1) related to Kafka lag.

At block 1208, the method 1200 includes scoring the dashboard template. In some examples, the dashboard template is scored based on a correlation coefficient between the alert metrics and the metrics traversed. In some examples, the score is based on averaging the absolute correlation value. In some examples, the correlation coefficient between the alert metrics is stored in the template. As an example, referring to FIG. 11D, example 1100D shows a score for templates 1101, 1103, and 1105 based on a correlation coefficient.

Accordingly, when a new alert (belonging to an alert cluster) is generated, there may be multiple templates on the alert cluster and the user may be presented with a dynamic contextual dashboard that is most associated with the alert based on a score, rather than presenting the user with all templates such that the user must manually view each of them.

At block 1210, the method 1200 includes, based on the dashboard template score satisfying a threshold, generating a dynamic contextual dashboard associated in context of the alert using the dashboard template assigned to the alert cluster. As an example, referring back to FIG. 11E, example 1100E shows two dynamic contextual dashboards 1107, 1109 associated in the context of the alert using the dashboard template assigned to the KafkaLag alert cluster.

At block 1212, the method 1200 includes scoring and ranking the dynamic contextual dashboard. As an example, referring back to FIG. 11F, example 1100F shows a user interface that scores and ranks the dynamic contextual dashboards based on the dashboard template score.

Optionally, at block 1214, the method 1200 includes causing a display of the dynamic contextual dashboard when troubleshooting a same or similar alert corresponding to the dashboard template.

In some examples, the method 1200 includes determining metric of the alert, determining whether a different API for troubleshooting the alert has the metrics information, tracking metrics that the API navigated, based on a determination that a user has not navigated more APIs, calculating the coefficient correlation, based on a determination that the different API for troubleshooting the alert does not have the metrics information, calculating the coefficient correlation, storing metrics based on threshold correlated coefficient and a count of a number of times troubleshooting metrics API hit, storing relevant navigated metrics as the dashboard template in context of an alert metrics, scoring the dashboard template, and assigning the dashboard template satisfying the score threshold to an alert cluster based on the alerting metrics.

In some examples, the method 1200 includes, when multiple templates are assigned to the alert cluster, cause a display of dynamic contextual dashboards based on respective scores assigned to each dynamic contextual dashboard. As an example, referring back to FIG. 11F, there are multiple templates assigned to the alert cluster of a KafkaLag and, as such, the UI 1111 displays two dynamic contextual dashboards that are ranked according to a score. The reason there may be multiple templates on a particular alert cluster is because each use case is different and, accordingly, each troubleshooting will be different. There can be any number of reasons why a CPU can be high and all of those troubleshooting scenarios will be different. For example, a CPU may be high because (1) the system is looping and consuming the CPU, (2) a large file is being written, or (3) lots of network traffic. Accordingly, if you get a CPU high, that necessarily doesn't mean that the previous operator was troubleshooting CPU high because of writing a large file onto the system. Instead, it could be a different reason such as a bug in the system, or an application getting into the loop. Thus, since each use case is different, each troubleshooting and workflow will be different.

FIG. 13 illustrates a flowchart of an example method for generating a dashboard template for generating a dynamic contextual dashboard when troubleshooting an alert in accordance with one or more techniques of this disclosure. The method 1300 may be performed by an apparatus, such as the client computer 170, as described above, or the computing device 1500, as described below. In some implementations, the method 1300 is performed by processing logic, including hardware, firmware, software, or a combination thereof. In some implementations, the method 1300 is performed by a processor executing code stored in a non-transitory computer-readable medium (e.g., a memory). Optional aspects are illustrated in dashed lines. The method 1300 includes generating a dashboard template for generating a dynamic contextual dashboard when troubleshooting an alert At block 1302, the method 1300 includes identifying an alert among a listing of alerts for troubleshooting the alert.

At block 1304, the method 1300 includes obtaining an alert cluster for the alert.

At block 1306, the method 1300 includes obtaining dashboard templates associated with the alert cluster. As an example, referring back to FIG. 6B, example 600b shows an example of a dashboard template associated with a consumer lag.

At block 1308, the method 1300 includes determining a related resource corresponding to the alert to scope metric correlation. In some examples, the related resource corresponds the alert based on being in a same group, a direct relationship, or an indirect relationship.

At block 1310, the method 1300 includes matching a template metrics coefficient index with a same metrics for scoped devices. In some examples, the template metrics is matched with the scoped resources and correlation for a new resource, alert metric on new alert corresponding to the new resource, and graph metric of related resources for the new alert is calculated.

At block 1312, the method 1300 includes generating a contextual dashboard for a selected alert based on matching the metrics for the dashboard template. In some examples, the contextual dashboard for a selected alert comprises alerts, sets of metrics for a dashboard, and a corresponding dashboard score for each dashboard, wherein the alerts include at least the identified alert.

At block 1314, the method 1300 includes ranking the dashboard based on a dashboard score.

At block 1316, the method 1300 includes causing a display of the contextual dashboard in a UI based on the rank.

In some examples, the method 1300 includes extracting resources associated with the alert metrics through a group, topology, a direct relationship, or an indirection relationship based on an API definition model, calculating coefficient correlation for the resources, filtering the resources metrics based on a threshold using the coefficient correlation, generating a dashboard with relevant metrics from the dashboard template, assigning a score and ranking the dashboard based on the score, and based on the determination that the dashboard template is not available, cause a display of top dashboards relevant to the alert based on the rankings.

FIG. 14 illustrates a flowchart of an example method for troubleshooting an alert via a dynamic generated dashboard in the context of an alert in accordance with one or more techniques of this disclosure. The method 1400 may be performed by an apparatus, such as the client computer 170, as described above, or the computing device 1500, as described below. In some implementations, the method 1400 is performed by processing logic, including hardware, firmware, software, or a combination thereof. In some implementations, the method 1400 is performed by a processor executing code stored in a non-transitory computer-readable medium (e.g., a memory). Optional aspects are illustrated in dashed lines. The method 1400 includes troubleshooting an alert via a dynamic contextual dashboard in the context of an alert.

At block 1402, the method 1400 includes identifying an alert among a listing of alerts for troubleshooting the alert. As an example, referring back to FIG. 4, the user interface 401 shows different alerts (e.g., alert #1, alert #2, and alert #3).

At block 1404, the method 1400 includes obtaining dashboard templates associated with an alert cluster. In some examples, the alert belongs to the alert cluster. As an example, referring back to FIG. 11B, example 1100B shows at least three dashboards (e.g., dashboard template #1, dashboard template #3, . . . and dashboard template #n) related to an alert cluster of a Kafka lag.

At block 1406, the method 1400 includes generating and scoring a dynamic contextual dashboard using the templates associated with the alert cluster. As an example, referring back to FIG. 11E, example 1100E shows a first dashboard 1107 with a score of 0.79 using the templates associated with the alert cluster of a KafkaLag and a second dashboard #n 1109 with a score of 0.70 using the templates associated with the alert cluster of a KafkaLag.

At block 1408, the method 1400 includes launching the dynamic contextual dashboard in context of the alert.

At block 1410, the method 1400 includes determining whether a dashboard template is available.

At block 1412, the method 1400 includes based on a determination that the dashboard template is available, determining a cause of the alert.

At block 1414, the method 1400 includes based on a determination that the cause of the alert is not determined or based on a determination that the dashboard template is not available, initiating troubleshooting the alert by navigating multiple metric and correlated metric.

At block 1416, the method 1400 includes tracking and mining user activity of navigated metrics.

At block 1418, the method 1400 includes determining a new dashboard template using the tracked metrics and correlation with alert metric.

At block 1420, the method 1400 includes assigning the new dashboard template to the alert cluster. In some examples, the new dashboard template is used for generating a new dynamic contextual dashboard for an alert associated with the alert cluster.

Optionally, the method 1400 further includes displaying the dynamic contextual dashboard from the dashboard template when troubleshooting a same or similar alert corresponding to the dashboard template, and, when multiple templates are assigned to the alert cluster, displaying dynamic contextual dashboards assigned to the alert cluster based respective scores assigned to each dynamic contextual dashboard. As an example, referring back to FIG. 11F, there are multiple templates assigned to the alert cluster of a KafkaLag and, as such, the UI 1111 displays two dynamic contextual dashboards that displayed and ranked according to a score.

FIG. 15 is a block diagram of a computing device 1500. The computing device 1500 may include software and/or hardware for providing functionality and features described herein. The computing device 1500 may therefore include one or more of: logic arrays, memories, analog circuits, digital circuits, software, firmware and processors. The hardware and firmware components of the computing device 1500 may include various specialized units, circuits, software and interfaces for providing the functionality and features described herein. For example, a system of two physical network objects may provide continual automated discovering of the topology information of macro-clusters and relationship between those macro-clusters.

The computing device 1500 has a processor 1510 coupled to a memory 1512, storage 1514, a network interface 1516 and an I/O interface 1518. The processor 1510 may be or include one or more microprocessors, field programmable gate arrays (FPGAs), application specific integrated circuits (ASICs), programmable logic devices (PLDs) and programmable logic arrays (PLAs).

The memory 1512 may be or include RAM, ROM, DRAM, SRAM and MRAM, and may include firmware, such as static data or fixed instructions, BIOS, system functions, configuration data, and other routines used during the operation of the computing device 1500 and processor 1510. The memory 1512 also provides a storage area for data and instructions associated with applications and data handled by the processor 1510. As used herein the term "memory" corresponds to the memory 1512 and explicitly excludes transitory media such as signals or waveforms.

The storage 1514 provides non-volatile, bulk or long-term storage of data or instructions in the computing device 1100. It may be internal or external storage. The storage 1514 may take the form of a magnetic or solid-state disk, tape, CD, DVD, or other reasonably high capacity addressable or serial storage medium. Multiple storage devices may be provided or available to the computing device 1500. Some of these storage devices may be external to the computing device 1500, such as network storage or cloud-based storage. As used herein, the terms "storage" and "storage medium" correspond to the storage 1514 and explicitly exclude transitory media such as signals or waveforms. In some cases, such as those involving solid-state memory devices, the memory 1512 and storage 1514 may be a single device.

The network interface 1516 includes an interface to a network such as a network that can be used to communicate calls, signals, streams, arrays, flagged samples and feedback described herein. The network interface 1516 may be wired or wireless.

The I/O interface 1518 interfaces the processor 1510 to peripherals (not shown) such as displays, video and still cameras, microphones, keyboards and USB devices.

In some cases, storage 1514 is a non-volatile machine-readable storage medium that includes all types of computer readable media, including magnetic storage media, optical storage media, and solid-state storage media. It should be understood that the software can be installed in and sold with the client computer 170. Alternatively, the software can be obtained and loaded into the client computer 170, including obtaining the software via a disc medium or from any manner of network or distribution system, including from a server owned by the software creator or from a server not owned but used by the software creator. The software can be stored on a server for distribution over the Internet.

The subject matter described herein can be implemented to realize one or more benefits or advantages. For instance, the techniques disclosed herein enable a method for performing troubleshooting using an alert context dashboard generated based on tracking metrics. As a result, users may more efficiently identify a cause of an alert by using the contextual dashboards to track same or similar alerts to reduce MTTI. In addition, the techniques disclosed here allow users to leverage experience and history of other troubleshooting user activities when troubleshooting. This in turn significantly reduces troubleshooting and root cause analysis time. Finally, the techniques disclosed herein also include a UI dashboard that allows a user to more easily visualize and understand system metrics.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing unit may be implemented in hardware (e.g., by processing circuitry), software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A computer-implemented method, the method comprising:

selecting an alert among alert clusters for troubleshooting the alert, tracking and capturing traces executed by user activities performed while troubleshooting the alert by monitoring alert details associated with the alert, monitoring different metrics and traces executed navigated by user troubleshooting activities, and obtaining Application Programming Interface (API) calls initiated for the user activities from log files, wherein the traces comprising different metrics navigated by the user are tracked via corresponding API calls and stored in log files, mining the log files for the traces at a regular time period based on an API discovery model that identifies an alert API and metric API to extract navigated metrics from traces relevant to troubleshooting, computing correlation coefficients between an alert metric, an extracted trace-derived metrics from API calls captured as traces, and an extracted navigated metric over an alert-specific time range, generating a dashboard template comprising a first column for storing alert metric information, a second column for identifiers of filtered navigated metrics and trace-derived indicators, and a third column for corresponding correlation coefficients, storing a reference of the dashboard template into an alert cluster definition, wherein the alert belongs to a alert cluster, generating a dynamic contextual dashboard in context of the alert using the dashboard template, the extracted navigated metrics, and trace-derived information over the alert-specific time range, wherein generating the dynamic contextual dashboard further comprises incorporating navigated trace information relevant to the alert; and displaying, on a display, the dynamic contextual dashboard when troubleshooting a same or similar alert corresponding to the dashboard template to reduce a mean time to identify.

2. The computer-implemented method of claim 1, the method further comprising:

upon a subsequent alert belonging to the alert cluster, scoping resource related to an alert resource group via group membership or topology relationships to limit correlation computations, scoring the dashboard template based on a correlation coefficient between the alert metrics and the metrics traversed, based on the dashboard template score satisfying a threshold, generating the dynamic contextual dashboard in context of the alert for the scoped resource using the dashboard template assigned to the alert cluster, and scoring and ranking the dynamic contextual dashboard.

3. The computer-implemented method of claim 1, wherein the dashboard template is generated by mining, filtering, and correlating the tracked user activities without intervention by a user.

4. The computer-implemented method of claim 2, the method further comprising:

when multiple templates are assigned to the alert cluster, cause a display of dynamic contextual dashboards based on respective scores assigned to each dynamic contextual dashboard.

5. The computer-implemented method of claim 2, wherein the alert cluster is determined based on an attribute or description of the alert.

6. The computer-implemented method of claim 1, wherein the dashboard template is scored based on a correlation coefficient between the alert metrics and the metrics traversed.

7. The computer-implemented method of claim 1, further comprising:

extracting navigated metrics, logs, and traces by matching the API calls to metric APIs and log APIs defined in an API model, wherein the API model is associated with a list of API to scans, wherein the API model comprises API listing to navigate metrics, logs and traces.

8. The computer-implemented method of claim 1, wherein the dashboard template stores alert metric information and alert metrics and corresponding correlation coefficients for each graph metric.

9. The computer-implemented method of claim 1, further comprising:

performing alert clustering to group similar alerts based on different attributes or contents and labeling the similar alerts via topic modeling or classification machine learning techniques.

10. The computer-implemented method of claim 1, further comprising:

determining resources and metric of the alert, determining whether a different API for troubleshooting the alert has metrics information, based on a determination that the different API for troubleshooting the alert has the metrics information, tracking metrics that the API navigated, based on a determination that a user has not navigated more APIs, calculating the coefficient correlation, based on a determination that the different API for troubleshooting the alert does not have the metrics information, calculating the coefficient correlation, storing metrics greater than a threshold correlated coefficient and a count of a number of times troubleshooting metrics API hits, storing relevant navigated metrics as the dashboard template in context of an alert metrics, scoring the dashboard template, and storing a reference to the dashboard template satisfying the score threshold to an alert cluster definition based on the alerting metrics.

11. A computer-implemented method, the method comprising:

selecting an alert among a listing of alerts clusters for troubleshooting the alert, obtaining an alert cluster for the alert, obtaining dashboard templates associated with the alert cluster by tracking and capturing traces executed by user activities performed while troubleshooting the alert by monitoring alert details associated with the alert, monitoring different metrics and traces executed navigated by user troubleshooting activities, and obtaining Application Programming Interface (API) calls initiated for user activities from log files, wherein the traces comprising different metrics navigated by the user are tracked via corresponding API calls and stored in log files, wherein the dashboard template comprises a first column for storing alert metric information, a second column for identifiers of filtered navigated metrics and trace-derived indicators, and a third column for corresponding correlation coefficients, determining a related resource corresponding to the alert to scope metric correlation, matching a template metrics with a same metrics for scoped resources, generating a dynamic contextual dashboard for a selected alert based on matching the metrics for the dashboard template and trace-derived information, wherein generating the dynamic contextual dashboard further comprises incorporating navigated trace information relevant to the alert, and cause, on a display, a display of the dynamic contextual dashboard in a user interface to reduce a mean time to identify.

12. The computer-implemented method of claim 11, further comprising:

ranking the dynamic contextual dashboard based on a dashboard score, wherein the contextual dashboard in the user interface is displayed based on the rank.

13. The computer-implemented method of claim 11, wherein a related resource corresponds the alert based on being in a same group, a direct relationship, or an indirect relationship.

14. The computer-implemented method of claim 11, wherein the template metrics is matched with the metrics of scoped resources and correlation for an alert metric on new alert corresponding to the new resource, and graph metric of related resources for the new alert is calculated, wherein the contextual dashboard for a selected alert comprises alerts, sets of metrics for a dashboard, and a corresponding dashboard score for each dashboard, wherein the alerts include at least the identified alert.

15. The computer-implemented method of claim 12, further comprising:

extracting resources associated with the alert metric through a group, topology, a direct relationship, or an indirect relationship based on an API definition model, calculating coefficient correlation for the resources metrics and alert metric, filtering the resources metrics based on a threshold using the coefficient correlation, generating a dashboard with relevant metrics from the dashboard template, wherein the dashboard template comprises a first column for storing alert metric information, a second column for identifiers of filtered navigated metrics, and a third column for corresponding correlation coefficients, assigning a score and ranking the dashboard based on the score, and causing, on the display, a display of top dashboards relevant to the alert based on the rankings.

16. A computer-implemented method, the method comprising:

selecting an alert among alert clusters for troubleshooting the alert;

obtaining dashboard templates associated with an alert cluster, wherein the alert belongs to the alert cluster;

generating and scoring a dynamic contextual dashboard using the templates associated with the alert cluster;

launching the dynamic contextual dashboard in context of the alert;

determining whether a dashboard template is available;

based on a determination that the dashboard template is available, determining a cause of the alert;

based on a determination that the cause of the alert is not determined or based on a determination that the dashboard template is not available, initiating troubleshooting the alert by navigating multiple metric and correlated metric;

tracking and capturing traces executed by user activities performed while troubleshooting the alert by monitoring alert details associated with the alert, monitoring different metrics and traces executed by user troubleshooting activities, and obtaining Application Programming Interface (API) calls initiated for the user activities from log files, wherein the traces comprising different metrics navigated by the user are tracked via corresponding API calls and stored in the log files;

determining a new dashboard template using the tracked traces and correlation with alert metric, wherein the dashboard template comprises a first column for storing alert metric information, a second column for identifiers of filtered navigated metrics and trace-derived indicators, and a third column for corresponding correlation coefficients;

storing a reference of the dashboard template into an alert cluster definition, wherein the new dashboard template is used for generating a new dynamic contextual dashboard for an alert associated with the alert cluster by incorporating navigated trace information relevant to the alert; and causing, on a display, a display of the dynamic contextual dashboard from the dashboard template when troubleshooting a same or similar alert corresponding to the dashboard template to reduce a mean time to identify.

17. The computer-implemented method of claim 16, further comprising:

when multiple templates are assigned to the alert cluster, cause a display of the dynamic contextual dashboards assigned to the alert cluster based respective scores assigned to each dynamic contextual dashboard.

\* \* \* \* \*